(12) United States Patent
Sasaki et al.

(10) Patent No.: US 12,438,217 B2
(45) Date of Patent: Oct. 7, 2025

(54) OUTER PACKAGE MATERIAL FOR ALL-SOLID-STATE BATTERIES, METHOD FOR PRODUCING SAME AND ALL-SOLID-STATE BATTERY

(71) Applicant: DAI NIPPON PRINTING CO., LTD., Tokyo (JP)

(72) Inventors: Miho Sasaki, Tokyo (JP); Atsuko Takahagi, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 699 days.

(21) Appl. No.: 17/438,577

(22) PCT Filed: Mar. 12, 2020

(86) PCT No.: PCT/JP2020/010970
§ 371 (c)(1),
(2) Date: Sep. 13, 2021

(87) PCT Pub. No.: WO2020/184693
PCT Pub. Date: Sep. 17, 2020

(65) Prior Publication Data
US 2022/0173462 A1    Jun. 2, 2022

(30) Foreign Application Priority Data

Mar. 12, 2019   (JP) .................. 2019-044534

(51) Int. Cl.
*H01M 50/126*     (2021.01)
*H01M 10/0562*    (2010.01)
(Continued)

(52) U.S. Cl.
CPC ..... *H01M 50/126* (2021.01); *H01M 10/0562* (2013.01); *H01M 50/131* (2021.01); *H01M 50/105* (2021.01); *H01M 2300/0068* (2013.01)

(58) Field of Classification Search
CPC ............ H01M 50/126; H01M 50/131; H01M 10/0562; H01M 50/105; H01M 2300/0068
See application file for complete search history.

(56) References Cited

U.S. PATENT DOCUMENTS

2009/0186270 A1*  7/2009  Harada ............... H01M 50/178
                                                             429/185
2016/0218327 A1   7/2016  Takahashi et al.
(Continued)

FOREIGN PATENT DOCUMENTS

CN      107431150 A      12/2017
JP      2001-297737 A    10/2001
(Continued)

OTHER PUBLICATIONS

Mar. 26, 2024 Office Action issued in Japanese Application No. 2021-505151.
(Continued)

*Primary Examiner* — Allison Bourke
*Assistant Examiner* — Robert Gene West
(74) *Attorney, Agent, or Firm* — Oliff PLC

(57) ABSTRACT

An outer package material for all-solid-state batteries, which is composed of a multilayer body that is sequentially provided, from the outer side, with at least a base material layer, a barrier layer and a thermally fusible resin layer in this order, and which is configured such that the multilayer body has a layer that has a buffering function on the outer side of the thermally fusible resin layer.

10 Claims, 3 Drawing Sheets

(51) Int. Cl.
H01M 50/105 (2021.01)
H01M 50/131 (2021.01)

(56) References Cited

U.S. PATENT DOCUMENTS

2018/0076423 A1    3/2018   Kokuryo et al.
2018/0233711 A1    8/2018   Kato

FOREIGN PATENT DOCUMENTS

| JP | 2004-091024 A | 3/2004 |
| JP | 2012-142228 A | 7/2012 |
| JP | 2012-203984 A | 10/2012 |
| JP | 2015-011952 A | 1/2015 |
| JP | 2016-139609 A | 8/2016 |
| JP | 2017-045578 A | 3/2017 |
| KR | 10-2013-0126106 A | 11/2013 |
| KR | 10-2016-0090563 A | 8/2016 |

OTHER PUBLICATIONS

Aug. 20, 2024 Office Action issued in Japanese Application No. 2021-505151.
Jun. 2, 2020 International Search Report issued in International Patent Application No. PCT/JP2020/010970.
Nov. 8, 2022 Extended European Search Report issued in European Patent Application No. 20769872.1.
Jun. 7, 2023 Office Action issued in Chinese Patent Application No. 202080020252.4.

* cited by examiner

OUTER PACKAGE MATERIAL FOR ALL-SOLID-STATE BATTERIES, METHOD FOR PRODUCING SAME AND ALL-SOLID-STATE BATTERY

TECHNICAL FIELD

The present disclosure relates to an exterior material for an all-solid-state battery, a method for producing the exterior material for an all-solid-state battery, and an all-solid-state battery.

BACKGROUND ART

An all-solid-state battery having a solid electrolyte as an electrolyte is known. The all-solid-state battery has the advantages of high safety and a wide operating temperature range because an organic solvent is not used in the battery.

On the other hand, it is known that the all-solid-state battery is likely to be delaminated between a solid electrolyte and a negative active material layer or a positive active material layer by expansion/shrinkage of a negative electrode or a positive electrode due to charge-discharge, so that deterioration of the battery proceeds.

As a method for suppressing delamination between a solid electrolyte and a negative active material layer or a positive active material layer, a technique is known in which an all-solid-state battery is constrained in a state of being pressed at a high pressure. For example, Patent Document 1 discloses a method for producing a battery, including a lamination step of preparing a laminate including a positive electrode current collector, a positive electrode layer, an electrolyte layer, a negative electrode layer and a negative electrode current collector in this order, a pressurization step of pressurizing the laminate prepared in the laminating step in a laminating direction, and a constraining step of constraining the laminate while pressurizing the laminate in the laminating direction at a pressure of 0.1 MPa or more and 100 MPa or less for a predetermined time after the pressurization step.

PRIOR ART DOCUMENT

Patent Document

Patent Document 1: Japanese Patent Laid-open Publication No. 2012-142228

SUMMARY OF THE INVENTION

Problems To Be Solved by the Invention

For suppressing delamination between a solid electrolyte and a negative active material layer or a positive active material layer in a use environment of the all-solid-state battery, it is desirable to constrain the solid electrolyte, the negative active material layer and the positive active material layer by high-pressure-pressing of the all-solid-state battery from the outside of an exterior material.

On the other hand, in recent years, all-solid-state batteries have been required to be diversified in shape and to be thinned and lightened with improvement of performance of electric cars, hybrid electric cars, personal computers, cameras, mobile phones, and so on. However, metallic exterior materials that have often been heretofore used for batteries have the disadvantage that it is difficult to keep up with diversification in shape, and there is a limit on weight reduction. Thus, there has been proposed a film-shaped exterior material with a base material, a metal foil layer and a heat-sealable resin layer laminated in this order has been proposed as an exterior material that is easily processed into diversified shapes and is capable of achieving thickness reduction and weight reduction.

In such a film-shaped exterior material, generally, a space for storing battery elements is provided by molding into a bag shape or molding using a mold, and battery elements such as an electrode and a solid electrolyte are disposed in the space, and the heat-sealable resin layers are heat-sealed to each other to obtain an all-solid-state battery in which battery elements are stored inside the exterior material.

By applying such a film-shaped exterior material to an exterior material of an all-solid-state battery, weight reduction of electric vehicles, hybrid electric vehicles and the like are expected.

As described above, it is desirable that the all-solid-state battery be constrained by high-pressure pressing from the outside of the exterior material even during use for suppressing delamination between the solid electrolyte and the negative active material layer or the positive active material layer, However, the inventors of the present disclosure have conducted studies, and resultantly found that when high-pressure pressing is performed from the outside of a film-shaped exterior material, it is extremely difficult to perform high-pressure pressing so as to apply uniform pressure to the entire press surface of the exterior material, and in particular, higher pressure is applied to the outer peripheral portion than the central portion of the press surface of the exterior material, so that constraint by high-pressure pressing is not uniform.

Under these circumstances, a main object of the present disclosure is to provide an exterior material for an all-solid-state battery which enables uniform pressing to a press surface of an all-solid-state battery.

Means for Solving the Problem

The inventors of the present disclosure have extensively conducted studies for achieving the above-described object. As a result, the present inventors have found that when in an exterior material for an all-solid-state battery which includes a laminate including at least a base material layer, a barrier layer, and a heat-sealable resin layer in this order from the outside, a layer having a buffering function is provided outside the heat-sealable resin layer of the laminate forming the exterior material, the layer having a buffering function serves as a pressure buffer layer against high-pressure pressing, so that a press surface of the all-solid-state battery can be uniformly pressed.

The present disclosure has been completed by further conducting studies based on the above-mentioned findings. That is, the present disclosure provides an invention of an aspect as described below:

An exterior material for an all-solid-state battery which includes a laminate including at least a base material layer, a barrier layer, and a heat-sealable resin layer in this order from the outside, the laminate including a layer having a buffer function outside the heat-sealable resin layer.

Advantages of the Invention

According to the present disclosure, it is possible to provide an exterior material for an all-solid-state battery which enables uniform pressing to a press surface of an all-solid-state battery. According to the present disclosure, it is also possible to provide a method for producing an exterior material for an all-solid-state battery, and an all-solid-state battery.

EMBODIMENTS OF THE INVENTION

Figure 1:
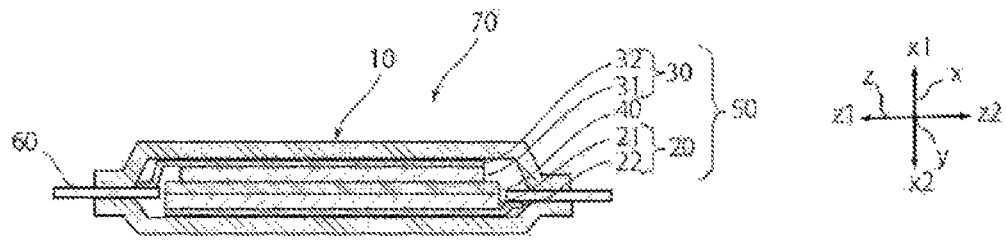
FIG. 1 is a schematic diagram showing an example of a cross-sectional structure of an all-solid-state battery to which an exterior material for an all-solid-state battery according to the present disclosure is applied.

An exterior material for an all-solid-state battery according to the present disclosure includes a laminate including at least a base material layer, a barrier layer, and a heat-sealable resin layer in this order from the outside, the laminate forming the exterior material includes a layer having a buffer function outside the heat-sealable resin layer. Since the exterior material for an all-solid-state battery according to the present disclosure has the above-mentioned configuration, it is possible to uniformly press a press surface of an all-solid-state battery. More specifically, even when the all-solid-state battery is constrained by high-pressure pressing, it is possible to uniformly press a press surface (i.e. apply uniform pressure to a press surface of an all-solid-state battery).

Hereinafter, the exterior material for an all-solid-state battery according to the present disclosure will be described in detail. In the present description, a numerical range indicated by the term "A to B" means "A or more" and "B or less". For example, the expression of "2 to 15 mm" means 2 mm or more and 15 mm or less.

1. Laminated Structure of Exterior Material for All-Solid-State Battery

For example, as shown in, for example, FIGS. 4 to 9, an exterior material 10 for an all-solid-state battery according to the present disclosure includes a laminate including at least a base material layer 1, a barrier layer 3 and a heat-sealable resin layer 4 in this order from the outside. Further, the laminate forming the exterior material 10 for an all-solid-state battery according to the present disclosure has a layer having a buffer function (hereinafter, sometimes referred to as a "buffer layer 6") outside the heat-sealable resin layer 4. In the exterior material 10 for an all-solid-state battery, the heat-sealable resin layer 4 is an innermost layer. In construction of the all-solid-state battery using the exterior material 10 for an all-solid-state battery and the battery element, the battery element is stored in a space formed by heat-sealing the peripheral edge portions of the heat-sealable resin layers 4 of the exterior material 10 for an all-solid-state battery which face each other. As described later, a function as a cushion (a function of dispersing pressure) may be imparted to the base material layer 1 to ensure that the base material layer 1 located on the outermost layer side forms the buffer layer 6 which is a layer having a buffer function (see FIG. 7).

As shown in, for example, FIGS. 5, 6, 8 and 9, the exterior material 10 for an all-solid-state battery may have an adhesive agent layer 2 between the base material layer 1 and the barrier layer 3 if necessary for the purpose of, for example, improving bondability between these layers. As shown in, for example, FIG. 6, an adhesive layer 5 may be present between the barrier layer 3 and the heat-sealable resin layer 4 if necessary for the purpose of, for example, improving bondability between these layers. A surface coating layer or the like may be provided on the outside of the base material layer 1 (on a side opposite to the heat-sealable resin layer 4 side) if necessary (not shown).

Figure 8:
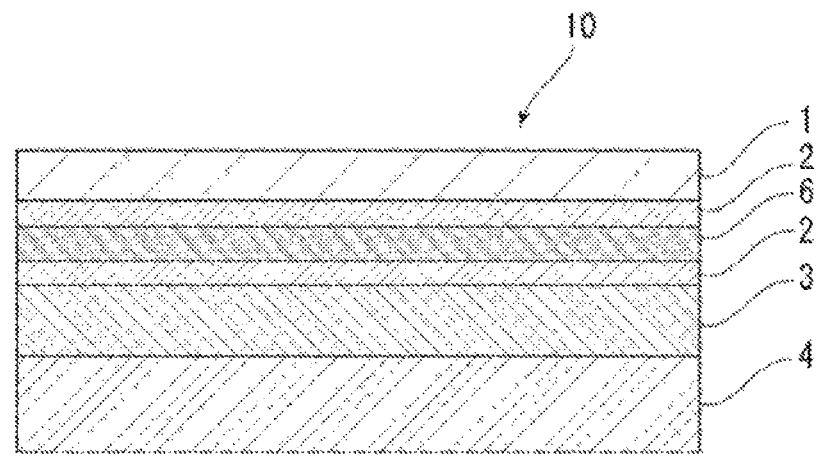
FIG. 8 is a schematic cross-sectional view showing an example of a laminated structure of an exterior material for an all-solid-state battery according to the present disclosure.
Figure 9:
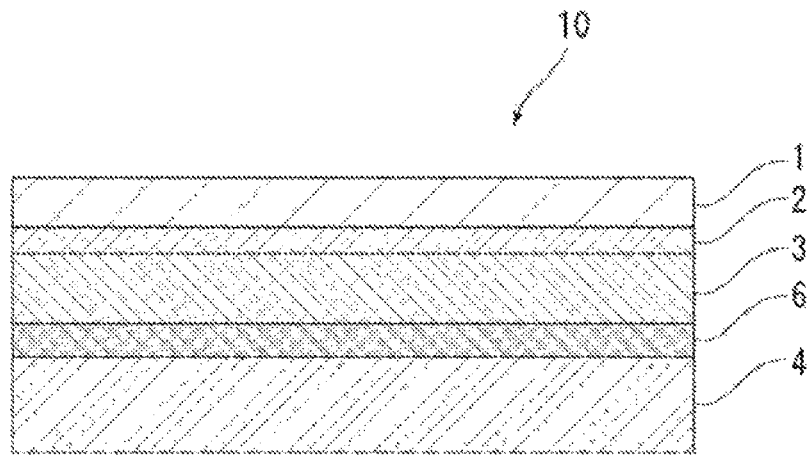
FIG. 9 is a schematic cross-sectional view showing an example of a laminated structure of an exterior material for an all-solid-state battery according to the present disclosure.

The buffer layer 6 is provided outside the heat-sealable resin layer 4, preferably outside the barrier layer 3 in the laminate forming the exterior material 10 for an all-solid-state battery. As shown in the schematic diagrams of FIGS. 4 to 6, the buffer layer 6 can be provided, for example, on the outside of the base material layer 1, specifically on the base material layer 1 on a side opposite to the barrier layer 3 side. As shown in the schematic diagram of FIG. 7, the base material layer 1 may form the buffer layer 6. The buffer layer 6 and the base material layer 1 can be bonded to each other by the adhesive agent layer 2 or the like. As shown in the schematic view of FIG. 8, the buffer layer 6 can be provided between the base material layer 1 and the barrier layer 3. When the buffer layer 6 is provided between the base material layer 1 and the barrier layer 3, for example, the buffer layer 6 can be bonded to each of the base material layer 1 and the barrier layer 3 using the adhesive agent layer 2 or the like as shown in FIG. 8. As shown in the schematic view of FIG. 9, the buffer layer 6 can be provided between the barrier layer 3 and the heat-sealable resin layer 4.

The buffer layer 6 provided in the laminate may be a single layer, or may have two or more layers. When two or more buffer layers 6 are provided, a plurality of buffer layers 6 may be provided adjacent to one another, or may be provided with the base material layer 1, the barrier layer 3 or the like interposed between the buffer layers 6.

Specific examples of the laminated configuration of the exterior material 10 for an all-solid-state battery include the following laminated configurations: a laminated configuration in which the buffer layer 6, the base material layer 1, the barrier layer 3 and the heat-sealable resin layer 4 are laminated in this order;

a laminated configuration in which the buffer layer 6, the base material layer 1, the adhesive agent layer 2, the barrier layer 3 and the heat-sealable resin layer 4 are laminated in this order;

a laminated configuration in which the buffer layer 6, the base material layer 1, the adhesive agent layer 2, the barrier layer 3, the adhesive layer 5 and the heat-sealable resin layer 4 are laminated in this order;

a laminated configuration in which the base material layer 1 having a buffer function (also serving as the buffer layer 6), the barrier layer 3 and the heat-sealable resin layer 4 are laminated in this order;

a laminated configuration in which the base material layer 1 having a buffer function (also serving as the buffer layer 6), the adhesive agent layer 2, the barrier layer 3 and the heat-sealable resin layer 4 are laminated in this order;

a laminated configuration in which the base material layer 1 having a buffer function (also serving as the buffer layer 6), the adhesive agent layer 2, the barrier layer 3, the adhesive layer 5 and the heat-sealable resin layer 4 are laminated in this order;

a laminated configuration in which the buffer layer 6, the adhesive agent layer 2, the base material layer 1, the barrier layer 3 and the heat-sealable resin layer 4 are laminated in this order;

a laminated configuration in which the buffer layer 6, the adhesive agent layer 2, the base material layer 1, the adhesive agent layer 2, the barrier layer 3 and the heat-sealable resin layer 4 are laminated in this order;

a laminated configuration in which the buffer layer 6, the adhesive agent layer 2, the base material layer 1, the adhesive agent layer 2, the barrier layer 3, the adhesive layer 5 and the heat-sealable resin layer 4 are laminated in this order;

a laminated configuration in which the base material layer 1, the adhesive agent layer 2, the buffer layer 6, the adhesive agent layer 2, the barrier layer 3 and the heat-sealable resin layer 4 are laminated in this order;

a laminated configuration in which the base material layer 1, the adhesive agent layer 2, the buffer layer 6, the adhesive agent layer 2, the barrier layer 3, the adhesive layer 5 and the heat-sealable resin layer 4 are laminated in this order;

a laminated configuration in which the buffer layer 6, the base material layer 1, the adhesive agent layer 2, the buffer layer 6, the adhesive agent layer 2, the barrier layer 3 and the heat-sealable resin layer 4 are laminated in this order;

a laminated configuration in which the buffer layer 6, the base material layer 1, the adhesive agent layer 2, the buffer layer 6, the adhesive agent layer 2, the barrier layer 3, the adhesive layer 5 and the heat-sealable resin layer 4 are laminated in this order;

a laminated configuration in which the base material layer 1, the barrier layer 3, the buffer layer 6 and the heat-sealable resin layer 4 are laminated in this order;

a laminated configuration in which the base material layer 1, the adhesive agent layer 2, the barrier layer 3, the buffer layer 6 and the heat-sealable resin layer 4 are laminated in this order;

a laminated configuration in which the base material layer 1, the adhesive agent layer 2, the barrier layer 3, the adhesive layer 5, the buffer layer 6 and the heat-sealable resin layer 4 are laminated in this order; and a laminated configuration in which the base material layer 1, the adhesive agent layer 2, the barrier layer 3, the buffer layer 6, the adhesive layer 5 and the heat-sealable resin layer 4 are laminated in this order.

The thickness of the laminate forming the exterior material 10 for an all-solid-state battery is not particularly limited, and is preferably about 10,000 μm or less, about 8,000 μm or less or about 5,000 μm or less from the viewpoint of cost reduction, improvement of the energy density and the like, and preferably about 100 μm or more, about 150 μm or more, or about 200 μm or more from the viewpoint of maintaining the function of the exterior material for an all-solid-state battery, which is protection of battery elements. The total thickness is preferably in the range of, for example, about 100 to 10,000 μm, about 100 to 8,000 μm, about 100 to 5,000 μm, about 150 to 10,000 μm, about 150 to 8,000 μm, about 150 to 5,000 μm, about 200 to 10,000 μm, about 200 to 8,000 μm or about 200 to 5,000 μm. When the exterior material 10 for an all-solid-state battery is applied to an all-solid-state battery, the thickness of the buffer layer may be reduced by high-pressure pressing, resulting in reduction of the thickness of the laminate.

Details of the layers forming the exterior material 10 for an all-solid-state battery will be described in the section "3. Layers Forming Exterior Material for All-Solid-State Battery".

2. All-Solid-State Battery

The all-solid-state battery to which the exterior material 10 for an all-solid-state battery according to the present disclosure (hereinafter, sometimes referred to as an "exterior material 10") is applied is not particularly limited except that the specific exterior material 10 is used. That is, battery elements (electrodes, a solid electrolyte, a terminal and the like), other than the exterior material 10, etc. are not particularly limited as long as they are applied to all-solid-state batteries, and the battery elements may be those that are used in known all-solid-state batteries. Hereinafter, an aspect in which the exterior material 10 for an all-solid-state battery according to the present disclosure is applied to an all-solid-state battery will be described in detail by taking the all-solid-state battery 70 of the present disclosure as an example.

Figure 2:
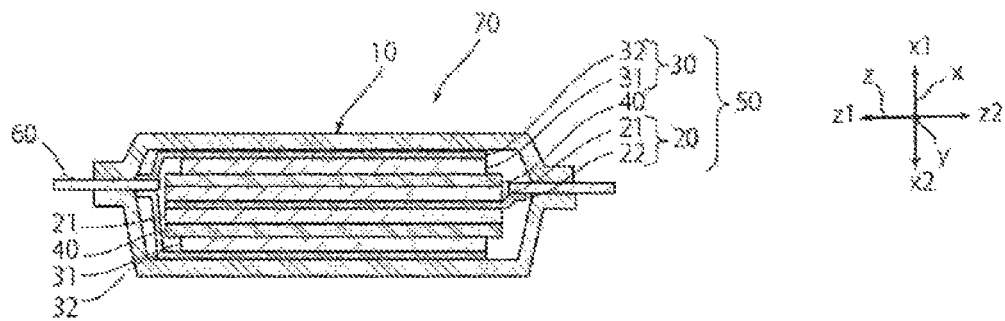
FIG. 2 is a schematic diagram showing an example of a cross-sectional structure of an all-solid-state battery to which an exterior material for an all-solid-state battery according to the present disclosure is applied.
Figure 3:
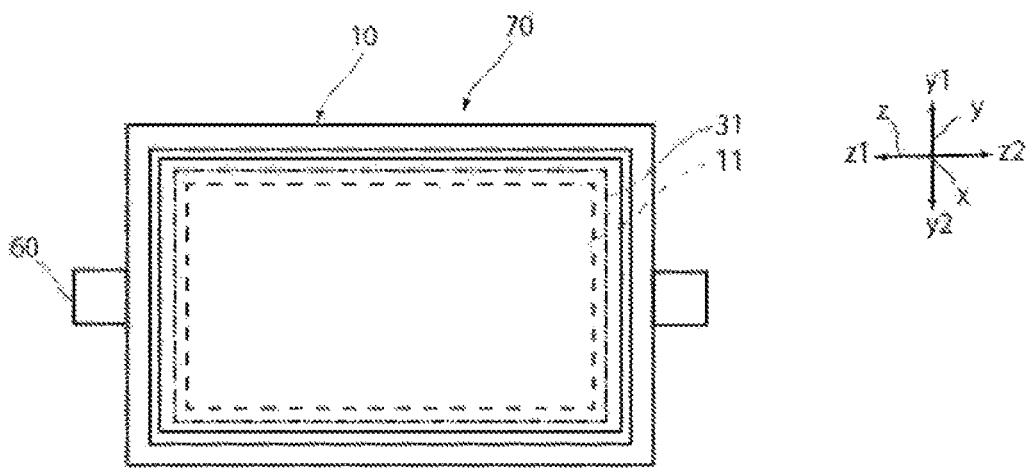
FIG. 3 is a schematic plan view of an example of an all-solid-state battery to which an exterior material for an all-solid-state battery according to the present disclosure is applied.

As shown in the schematic diagrams of FIGS. 1 to 3, the all-solid-state battery 70 of the present disclosure is one in which a battery element including at least a unit cell 50 including a positive active material layer 31, a negative active material layer 21, and a solid electrolyte layer 40 laminated between the positive active material layer 31 and the negative active material layer 21 is stored in a packaging formed from the exterior material 10 for an all-solid-state battery according to present disclosure. More specifically, the positive active material layer 31 is laminated on the positive electrode current collector 32 to form the positive electrode layer 30, and the negative active material layer 21 is laminated on the negative electrode current collector 22 to form the negative electrode layer 20. The positive electrode current collector 32 and the negative electrode current collector 22 are each bonded to a terminal 60 exposed to the outside and electrically connected to the external environment. The solid electrolyte layer 40 is laminated between the positive electrode layer 30 and the negative electrode layer 20, and the positive electrode layer 30, the negative electrode layer 20 and the solid electrolyte layer 40 form the unit cell 50. The battery element of the all-solid-state battery 70 may include only one unit cell 50 or may include a plurality of unit cells 50. FIG. 1 shows an all-solid-state battery 70 including one unit cell 50 as a battery element, and FIG. 2 shows an all-solid-state battery 70 in which two unit cells 50 are laminated to form a battery element.

In the all-solid-state battery 70, the battery element is covered such that a flange portion (region where heat-sealable resin layers are in contact with each other) can be formed on the periphery edge of the battery element while the terminal 60 connected to each of the positive electrode layer 30 and the negative electrode layer 20 protrudes to the outside, and the heat-sealable resin layers at the flange portion are heat-sealed to each other, thereby providing an all-solid-state battery including an exterior material for an all-solid-state battery. When the battery element is stored in the packaging formed from the exterior material for an all-solid-state battery according to the present disclosure, the packaging is formed in such a manner that the heat-sealable resin portion of the exterior material for an all-solid-state battery according to the present disclosure is on the inner side (a surface contacting the battery element).

High-pressure pressing is performed on the entire press surface 11 (e.g. a region surrounded by a two-dot chain line in the schematic diagram of FIG. 3) of the exterior material 10 when high-pressure pressing is performed from the outside of the exterior material 10 in the all-solid-state battery 70 of the present disclosure as shown in the schematic diagram of FIG. 3.

Specifically, as described above, it has been heretofore desirable that the all-solid-state battery be constrained at a high pressure from the outside of the exterior material for suppressing delamination between the solid electrolyte and the negative active material layer or the positive active material layer. In constraint of the all-solid-state battery at a high pressure, a high pressure is applied to the battery element portion of the all-solid-state battery in plan view of the all-solid-state battery 70. The inventors of the present disclosure have conducted studies, and resultantly found that when high-pressure pressing is performed from the outside of a film-shaped exterior material, it is extremely difficult to perform high-pressure pressing so as to apply uniform pressure to the entire press surface of the exterior material, and in particular, higher pressure is applied to the outer peripheral portion than the central portion of the press surface of the exterior material, so that constraint by high-pressure pressing is not uniform. In the exterior material 10 for an all-solid-state battery according to the present disclosure, the laminate forming the exterior material 10 has a buffer layer on the outside (barrier layer 3 side) of the heat-sealable resin layer 4. Thus, on the press surface 11 at which a high pressure is applied to the all-solid-state battery, the buffer layer 6 performs a function as a cushion to disperse the pressure applied to the press surface 11 of the exterior material 10, thereby enabling uniform pressing on the press surface of the all-solid-state battery. By uniformly pressing the press surface of the all-solid-state battery, for example, delamination between the solid electrolyte and the positive active material layer can be more suitably suppressed.

In general, in the all-solid-state battery, the area of the positive active material layer 31 is the same as the area of the negative active material layer 21 or smaller than the area of the negative active material layer 21 in plan view of the all-solid-state battery. In addition, a portion where the all-solid-state battery is pressed at a high pressure generally corresponds to a portion where the positive active material layer is present. It is the press surface 11 of the exterior material 10 has an area equal to or less than the area of the positive active material layer 31 as shown in the schematic view of FIG. 3.

As described above, the all-solid-state battery to which the exterior material 10 of the present disclosure is applied is not particularly limited as long as a specific exterior material 10 is used, and the same applies to the all-solid-state battery 70 of the present disclosure. Hereinafter, materials and the like of members forming the battery element of the all-solid-state battery to which the exterior material 10 of the present disclosure is applied will be exemplified. When by opposing two exterior materials to each other, the battery element is sealed to obtain the all-solid-state battery 70 as shown in the schematic diagrams of FIGS. 1 and 2, the exterior material on at least one surface of the all-solid-state battery 70 of the present disclosure may be composed of the exterior material 10 of the present disclosure, and it is preferable that exterior materials on both surfaces are composed of the exterior material 10 of the present disclosure from the viewpoint of enabling uniform pressing on the press surface of the all-solid-state battery. When all-solid-state batteries are laminated to form a module, the exterior material 10 of the present disclosure may be applied to the exterior material on one surface.

In the battery element of the all-solid-state battery 70, at least the positive electrode layer 30, the negative electrode layer 20 and the solid electrolyte layer 40 form the unit cell 50 as described above. The positive electrode layer 30 has a structure in which the positive active material layer 31 is laminated on the positive electrode current collector 32. The negative electrode layer 20 has a structure in which the negative active material layer 21 is laminated on the negative electrode current collector 22. The positive electrode current collector 32 and the negative electrode current collector 22 are each bonded to a terminal 60 exposed to the outside and electrically connected to the external environment.

[Positive Active Material Layer 31]

The positive active material layer 31 is a layer containing at least a positive active material. If necessary, the positive active material layer 31 may further contain a solid electrolyte material, a conductive material, a binding material and the like in addition to the positive active material.

The positive active material is not particularly limited, and examples thereof include oxide active materials and sulfide active materials. When the all-solid-state battery is an all-solid-state lithium battery, examples of the oxide active material used as the positive active material include rock salt layered active materials such as $LiCoO_2$, $LiMnO_2$, $LiNiO_2$, $LiVO_2$ and $LiNi_{1/3}Co_{1/3}Mn_{1/3}O_2$, spinel type active materials such as $LiMn_2O_4$ and $Li(Ni_{0.5}Mn_{1.5})O_4$, olivine type active materials such as $LiFePO_4$ and $LiMnPO_4$, and Si-containing active materials such as $Li_2FeSiO_4$ and $Li_2MnSiO_4$. In addition, examples of the sulfide active material used as the positive active material of the all-solid-state lithium battery include copper shredder, iron sulfide, cobalt sulfide and nickel sulfide.

The shape of the positive active material is not particularly limited, and examples thereof include a particle shape. Preferably, the mean particle size ($D_{50}$) of the positive active material is, for example, about 0.1 to 50 µm. The content of the positive active material in the positive active material layer 31 is preferably about 10 to 99 mass %, more preferably about 20 to 90 mass %.

Preferably, the positive active material layer 31 further contains a solid electrolyte material. This enables improvement of ion conductivity in the positive active material layer 31. The solid electrolyte material contained in the positive active material layer 31 is the same as the solid electrolyte material exemplified for the solid electrolyte layer 40 described later. The content of the solid electrolyte material in the positive active material layer is preferably about 1 to 90 mass %, more preferably about 10 to 80 mass %.

The positive active material layer 31 may further contain a conductive material. Addition of a conductive material enables improvement of the electron conductivity of the positive active material layer. Examples of the conductive material include acetylene black, Ketjen black and carbon fiber. The positive active material layer may further contain a binding material. Examples of the binding material include fluorine-containing binding materials such as polytetrafluoroethylene (PTFE) and polyvinylidene fluoride (PVDF).

The thickness of the positive active material layer 31 is appropriately set according to the size and the like of the all-solid-state battery, and is preferably about 0.1 to 1,000 μm.

[Positive Electrode Current Collector 32]

Examples of the material forming the positive electrode current collector 32 include stainless steel (SUS), aluminum, nickel, iron, titanium and carbon.

The thickness of the positive electrode current collector 32 is appropriately set according to the size and the like of the all-solid-state battery, and is preferably about 10 to 1,000 μm.

[Negative Active Material Layer 21]

The negative active material layer 21 is a layer containing at least a negative active material. If necessary, the negative active material layer 21 may contain a solid electrolyte material, a conductive material, a binding material and the like in addition to the negative active material.

The negative active material is not particularly limited, and examples thereof include carbon active materials, metal active materials and oxide active materials. Examples of the carbon active material include graphite such as mesocarbon microbeads (MCMB) and highly oriented graphite (HOPG), and amorphous carbon such as hard carbon and soft carbon. Examples of the metal active material include In, Al, Si, and Sn. Examples of the oxide active material include $Nb_2O_5$, $Li_4Ti_5O_{12}$ and SiO.

The shape of the negative active material is not particularly limited, and examples thereof include a particle shape and a film shape. The mean particle size ($D_{50}$) of the negative active material is preferably about 0.1 to 50 μm. The content of the negative active material in the negative active material layer 21 is, for example, about 10 to 99 mass %, more preferably about 20 to 90 mass %.

Preferably, the negative active material layer 21 further contains a solid electrolyte material. This enables improvement of ion conductivity in the negative active material layer 21. The solid electrolyte material contained in the negative active material layer 21 is the same as the solid electrolyte material exemplified for the solid electrolyte layer 40 described later. The content of the solid electrolyte material in the negative active material layer 21 is preferably about 1 to 90 mass %, more preferably about 10 to 80 mass %.

The negative active material layer 21 may further contain a conductive material. The negative active material layer 21 may further contain a binding material. The conductive material and the binding material are the same as those exemplified for the positive active material layer 31 described above.

The thickness of the negative active material layer 21 is appropriately set according to the size and the like of the all-solid-state battery, and is preferably about 0.1 to 1,000 μm.

[Negative Electrode Current Collector 22]

Examples of the material forming the negative electrode current collector 22 include stainless steel (SUS), copper, nickel, and carbon.

The thickness of the negative electrode current collector 22 is appropriately set according to the size and the like of the all-solid-state battery, and is preferably about 10 to 1,000 μm.

[Solid Electrolyte Layer 40]

The solid electrolyte layer 40 is a layer containing a solid electrolyte material. Examples of the solid electrolyte material include sulfide solid electrolyte materials and oxide solid electrolyte materials.

Sulfide solid electrolyte materials are preferable because many of the sulfide solid electrolyte materials have higher ion conductivity over oxide solid electrolyte materials, and oxide solid electrolyte materials are preferable because they have higher chemical stability over sulfide solid electrolyte materials.

Specific examples of the oxide solid electrolyte material include compounds having a NASICON-type structure. Examples of the compound having a NASICON-type structure include a compound represented by the general formula $Li_{1+x}Al_xGe_{2-x}(PO_4)_3$ (0≤x≤2). In particular, the compound is preferably $Li_{1.5}Al_{0.5}Ge_{1.5}(PO_4)_3$. Examples of the compound having a NASICON-type structure include a compound represented by the general formula $Li_{1+x}AlxTi_{2-x}(PO_4)_3$ (0≤x≤2). In particular, the compound is preferably $Li_{1.5}Al_{0.5}Ti_{1.5}(PO_4)_3$. Examples of the oxide solid electrolyte material used for the all-solid lithium secondary battery include LiLaTiO (e.g. $Li_{0.34}La_{0.51}TiO_3$) and LiPON (e.g. $Li_{2.9}PO_{3.3}N_{0.46}$) and LiLaZrO (e.g. $Li_7La_3Zr_2O_{12}$).

Specific examples of the sulfide solid electrolyte material include $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2SP_2S_5$—ZmSn (where each of m and n is a positive number, and Z is any of Ge, Zn, and Ga), $Li_2S$—$GeS_2$, $Li_2S$—$SiS_2$—$Li_3PO_4$, and $Li_2S$—$SiS_2$—$Li_xMO_y$, (where each of x and y is a positive number, and M is any one of P, Si, Ge, B, Al, Ga, and In). Note that the above description of "$Li_2S$—$P_2S_5$" means a sulfide solid electrolyte material obtained using a raw material composition containing $Li_2S$ and $P_2S_5$, and the same applies to other descriptions. The sulfide solid electrolyte material may be sulfide glass or crystallized sulfide glass.

The content of the solid electrolyte material in the solid electrolyte layer 40 is not particularly limited, and is preferably 60 mass % or more, more preferably 70 mass % or more, still more preferably 80 mass % or more. The solid electrolyte layer may contain a binding material or may include only a solid electrolyte material.

The thickness of the solid electrolyte layer 40 is appropriately set according to the size and the like of the all-solid-state battery, and is preferably about 0.1 to 1,000 μm, more preferably about 0.1 to 300 μm.

The all-solid-state battery 70 of the present disclosure can be suitably used in an environment of being constrained under high pressure from the outside. From the viewpoint of suitably suppressing delamination between the solid electrolyte and the negative active material layer and the positive active material layer, the pressure for constraining the all-solid-state battery 70 from the outside is preferably about 0.1 MPa or more, more preferably 5 MPa or more, still more preferably about 1 MPa or more, and preferably about 100 MPa or less, more preferably about 30 MPa or less, and is preferably in the range of about 0.1 to 100 MPa, about 0.1 to 70 MPa, about 5 to 100 MPa, about 5 to 70 MPa, about 10 to 100 MPa or about 1 to 30 MPa. Examples of the method for constraining the all solid-state battery 70 under high pressure from the outside include a method in which the all-solid-state battery is sandwiched between metal plates or the like, and fixed in a state of being pressed at high pressure (e.g. tightened with a vise or the like).

From the same viewpoint, the temperature at which the all-solid-state battery 70 is constrained from the outside is preferably 20° C. or higher, more preferably 40° C. or higher, and preferably 200° C. or lower, more preferably 150° C. or lower, and is preferably in the range of about 20 to 150° C. or about 40 to 150° C.

3. Layers forming exterior material for all-solid-state battery

The exterior material 10 of the present disclosure includes a laminate including at least the base material layer 1, the barrier layer 3 and the heat-sealable resin layer 4 in this order from the outside, and the laminate further includes the buffer layer 6 outside the heat-sealable resin layer 4. Hereinafter, the layers forming the exterior material 10 of the present disclosure will be described in detail.

[Buffer Layer 6]

In the present disclosure, the buffer layer 6 is a layer which is provided on the heat-sealable resin layer 4 on the barrier layer 3 side for enabling uniform pressing on the press surface of the solid battery, and exhibits a cushioning function against high-pressure pressing (has a pressure buffer function).

Figure 4:
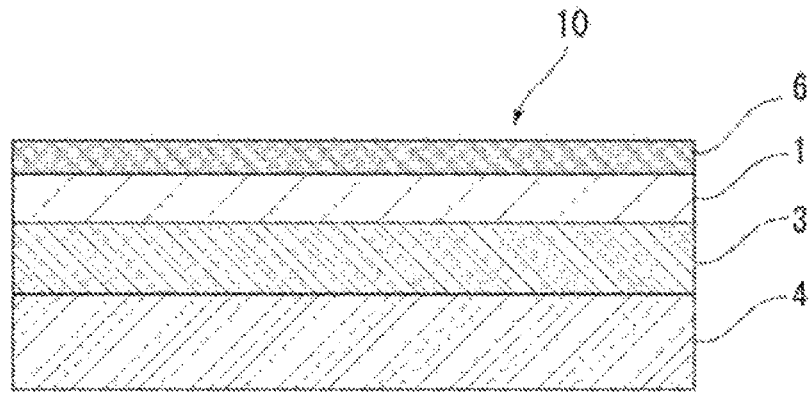
FIG. 4 is a schematic cross-sectional view showing an example of a laminated structure of an exterior material for an all-solid-state battery according to the present disclosure.
Figure 5:
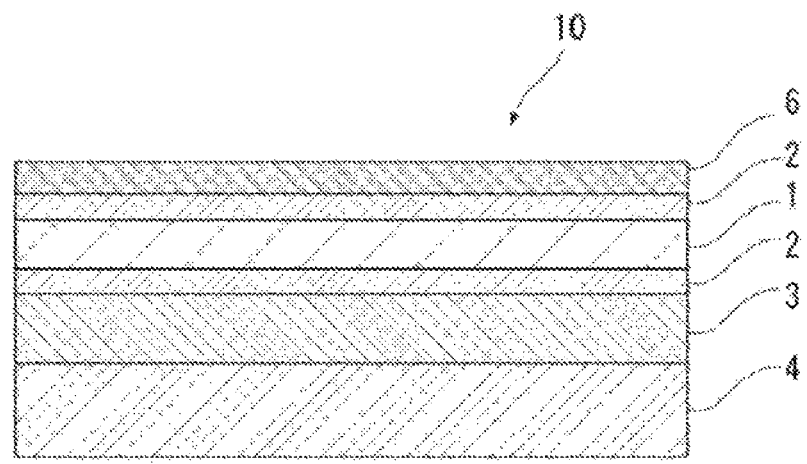
FIG. 5 is a schematic cross-sectional view showing an example of a laminated structure of an exterior material for an all-solid-state battery according to the present disclosure.
Figure 6:
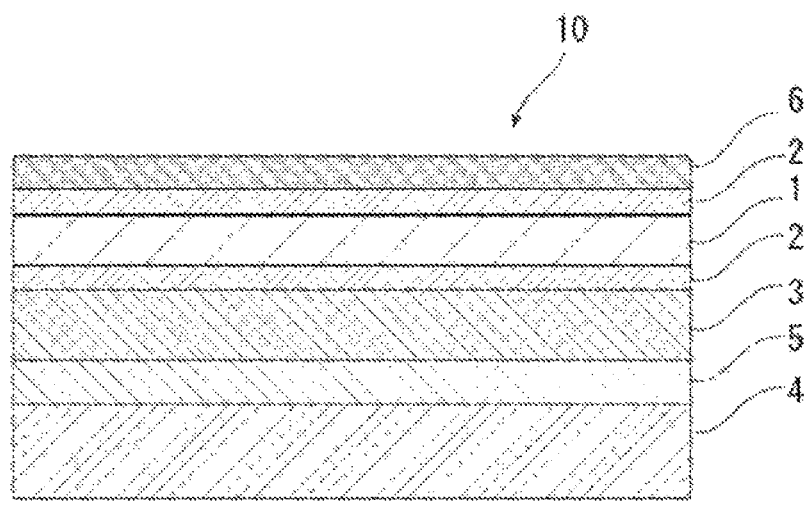
FIG. 6 is a schematic cross-sectional view showing an example of a laminated structure of an exterior material for an all-solid-state battery according to the present disclosure.
Figure 7:
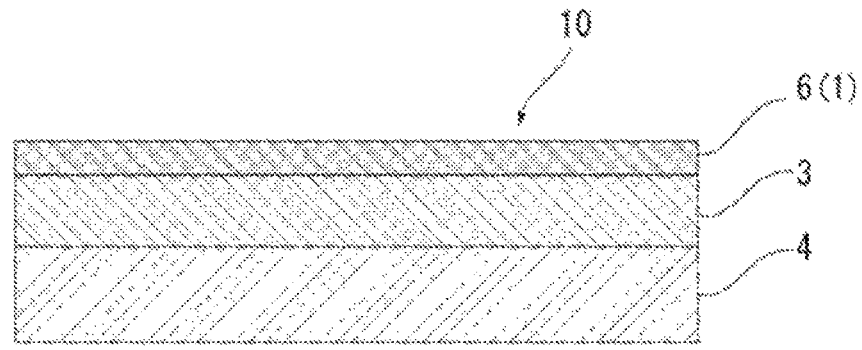
FIG. 7 is a schematic cross-sectional view showing an example of a laminated structure of an exterior material for an all-solid-state battery according to the present disclosure.

As shown in the schematic diagrams of FIGS. 4 to 6, the buffer layer 6 can be provided outside the heat-sealable resin layer 4, preferably outside the barrier layer 3, and provided on the outside of the base material layer 1. As shown in the schematic diagram of FIG. 7, the base material layer 1 can also form a buffer layer. The buffer layer 6 and the base material layer 1 can be bonded to each other by the adhesive agent layer 2 or the like. As shown in the schematic view of FIG. 8, the buffer layer 6 can be provided between the base material layer 1 and the barrier layer 3. When the buffer layer 6 is provided between the base material layer 1 and the barrier layer 3, for example, the buffer layer 6 can be bonded to each of the base material layer 1 and the barrier layer 3 using the adhesive agent layer 2 or the like as shown in FIG. 8. As shown in the schematic view of FIG. 9, the buffer layer 6 can be provided between the barrier layer 3 and the heat-sealable resin layer 4.

The buffer layer 6 provided in the laminate may be a single layer, or may have two or more layers. When two or more buffer layers 6 are provided, a plurality of buffer layers 6 may be provided adjacent to one another, or may be provided with the base material layer 1, the barrier layer 3 or the like interposed between the buffer layers 6.

In general, in the all-solid-state battery, the area of the positive active material layer 31 is the same as the area of the negative active material layer 21 or smaller than the area of the negative active material layer 21 in plan view of the all-solid-state battery as described above. In addition, a portion where the all-solid-state battery is pressed at a high pressure generally corresponds to a portion where the positive active material layer is present. It is the press surface 11 of the exterior material 10 has an area equal to or less than the area of the positive active material layer 31 as shown in the schematic view of FIG. 3.

The material forming the buffer layer 6 is not particularly limited as long as it can serve as a cushion against high-pressure pressing (can disperse pressure), and rubber, nonwoven fabrics, expanded sheets and the like are preferable.

The rubber is not particularly limited as long as it has elasticity, and examples thereof include natural rubber, fluororubber, and silicone rubber. The rubber hardness is preferably about 20 to 90.

The material for forming the nonwoven fabric is not particularly limited. Preferably, the same resins as those exemplified for the base material layer 1 described later are exemplified. Since the all-solid-state battery is assumed to be used in a high-temperature environment, it is preferable that the nonwoven fabric is composed of a material excellent in heat resistance.

From the viewpoint of uniformly dispersing the pressure from high pressure pressing, the areal weight of the nonwoven fabric is preferably about 20 g/m$^2$ or more, more preferably about 30 g/m$^2$ or more, still more preferably 100 g/m$^2$ or more, and preferably about 300 g/m$^2$ or less, more preferably about 200 g/m$^2$ or less, and is preferably in the range of about 20 to 300 g/m$^2$, about 20 to 200 g/m$^2$, about 30 to 300 g/m$^2$, about 30 to 200 g/m$^2$, about 100 to 300 g/m$^2$ or about 100 to 200 g/m$^2$, especially preferably about 100 to 300 g/m$^2$ or about 100 to 200 g/m$^2$.

From the viewpoint of uniformly dispersing the pressure from high pressure pressing, the fiber diameter of the fiber forming the nonwoven fabric is preferably about 5 µm or more, more preferably about 15 µm or more, and preferably 60 µm or less, more preferably about 40 µm or less, and is preferably in the range of about 5 to 60 µm, about 5 to 40 µm, about 15 to 60 µm or about 15 to 40 µm, especially preferably about 5 to 40 µm.

The thickness of the buffer layer 6 is not particularly limited as long as the pressure from high-pressure pressing can be uniformly dispersed, and the thickness is preferably about 55 µm or more, more preferably about 75 µm or more, and preferably about 10,000 µm or less, more preferably about 8,000 µm or less, and is preferably in the range of about 55 to 8,000 µm. In particular, when the buffer layer 6 is formed of a nonwoven fabric, the thickness of the buffer layer 6 is preferably about 100 µm or more, about 200 µm or more, about 1,000 µm or more, about 5,000 µm or less, about 3,000 µm or less, and is preferably in the range of about 100 to 5,000 µm, about 100 to 3,000 µm, about 200 to 5,000 µm, about 200 to 3,000 µm, about 1,000 to 5,000 µm, or about 1,000 to 3,000 µm, especially preferably 1,000 to 3,000 µm. In particular, when the buffer layer 6 is composed of rubber, the thickness of the buffer layer 6 is preferably about 10 mm or less, about 5 mm or less, about 2 mm or less, or about 0.5 mm or more, preferably in the range of about 0.5 to 10 mm, about 0.5 to 5 mm or about 0.5 to 2 mm.

[Base Material Layer 1]

In the present disclosure, the base material layer 1 is a layer provided for the purpose of, for example, exhibiting a function as a base material of the exterior material for an all-solid-state battery. The base material layer 1 is located on the outer layer side of the exterior material for an all-solid-state battery.

The material that forms the base material layer 1 is not particularly limited as long as it has a function as a base material, i.e. at least insulation quality. The base material layer 1 can be formed using, for example, a resin, and the resin may contain additives described later.

When the base material layer 1 can exhibit a pressure buffer function of uniformly dispersing the pressure from high-pressure pressing, the base material layer 1 may form the buffer layer 6 which is a layer having a buffer function. Specifically, when the base material layer 1 is formed from the rubber or nonwoven fabric exemplified in the section [Buffer layer 6] above, the base material layer 1 can form the buffer layer 6, and the buffer layer 6 is not required to be separately provided in addition to the base material layer 1 serving as the buffer layer 6.

When the base material layer 1 is formed of a resin, the base material layer 1 may be, for example, a resin film formed of a resin, or may be formed by applying a resin. In general, a base material layer formed by applying a resin film or a resin is generally hard, and hardly exhibits a function of uniformly dispersing the pressure from high-pressure pressing. Thus, when the base material layer 1 is formed of such a material, the base material layer 1 hardly forms the buffer layer 6, and it is preferable to provide the buffer layer 6 separately from the base material layer 1.

When the base material layer 1 is formed from a resin film, the resin film may be an unstretched film or a stretched film. Examples of the stretched film include uniaxially stretched films and biaxially stretched films, and biaxially stretched films are preferable. Examples of the stretching method for forming a biaxially stretched film include a sequential biaxial stretching method, an inflation method, and a simultaneous biaxial stretching method. Examples of the method for applying a resin include a roll coating method, a gravure coating method and an extrusion coating method.

Examples of the resin that forms the base material layer 1 include resins such as polyester, polyamide, polyolefin, epoxy resin, acrylic resin, fluororesin, polyurethane, silicone resin and phenol resin, and modified products of these resins. The resin that forms the base material layer 1 may be a copolymer of these resins or a modified product of the copolymer. Further, a mixture of these resins may be used.

Of these resins, polyester and polyamide are preferable as resins that form the base material layer 1.

Specific examples of the polyester resin include polyethylene terephthalate, polybutylene terephthalate, polyethylene naphthalate, polybutylene naphthalate, polyethylene isophthalate, and copolyesters. Examples of the copolyester include copolyesters having ethylene terephthalate as a main repeating unit. Specific examples thereof include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene (terephthalate/decane dicarboxylate). These polyesters may be used alone, or may be used in combination of two or more thereof.

Specific examples of the polyamide include polyamides such as aliphatic polyamides such as nylon 6, nylon 66, nylon 610, nylon 12, nylon 46, and copolymers of nylon 6 and nylon 66; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polyamide MXD6 (polymethaxylylene adipamide); cycloaliphatic polyamides such as polyamide PACM6 (polybis(4-aminocyclohexyl)methaneadipamide; polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof.

The base material layer 1 contains preferably at least one of a polyester film, a polyamide film and a polyolefin film, preferably at least one of a stretched polyester film, a stretched polyamide film and a stretched polyolefin film, still more preferably at least one of a stretched polyethylene terephthalate film, a stretched polybutylene terephthalate film, a stretched nylon film and a stretched polypropylene film, even more preferably at least one of a biaxially stretched polyethylene terephthalate film, a biaxially stretched polybutylene terephthalate film, a biaxially stretched nylon film, and a biaxially stretched polypropylene film.

The base material layer 1 may be a single layer, or may include two or more layers. When the base material layer 1 includes two or more layers, the base material layer 1 may be a laminate obtained by laminating resin films with an adhesive or the like, or a resin film laminate obtained by co-extruding resins to form two or more layers. The resin film laminate obtained by co-extruding resins to form two or more layers may be used as the base material layer 1 in an unstretched state, or may be uniaxially stretched or biaxially stretched and used as the base material layer 1. When the base material layer 1 is a single layer, it is preferable that the base material layer 1 is composed of a single layer of polyester resin.

Specific examples of the resin film laminate with two or more layers in the base material layer 1 include laminates of a polyester film and a nylon film, nylon film laminates with two or more layers, and polyester film laminates with two or more layers. Laminates of a stretched nylon film and a stretched polyester film, stretched nylon film laminates with two or more layers, and stretched polyester film laminates with two or more layers are preferable. For example, when the base material layer 1 is a resin film laminate with two layers, the base material layer 1 is preferably a laminate of a polyester resin film and a polyester resin film, a laminate of a polyamide resin film and a polyamide resin film, or a laminate of a polyester resin film and a polyamide resin film, more preferably a laminate of a polyethylene terephthalate film and a polyethylene terephthalate film, a laminate of a nylon film and a nylon film, or a laminate of a polyethylene terephthalate film and a nylon film.

When the base material layer 1 is a resin film laminate with two or more layers, the two or more resin films may be laminated with an adhesive interposed therebetween. Specific examples of the preferred adhesive include the same adhesives as those exemplified for the adhesive agent layer 2 described later. The method for laminating a resin film having two or more layers is not particularly limited, and a known method can be employed. Examples thereof include a dry lamination method, a sand lamination method, an extrusion lamination method and a thermal lamination method, and a dry lamination method is preferable. When the resin film is laminated by a dry lamination method, it is preferable to use a polyurethane adhesive as the adhesive. Here, the thickness of the adhesive is, for example, about 2 to 5 μm. In addition, the lamination may be performed with an anchor coat layer formed on the resin film. Examples of the anchor coat layer include the same adhesives as those exemplified for the adhesive agent layer 2 described later. Here, the thickness of the anchor coat layer is, for example, about 0.01 to 1.0 μm.

Additives such as a lubricant, a flame retardant, an antiblocking agent, an antioxidant, a light stabilizer, a tackifier and an antistatic agent may be present on at least one of the base material layer 1 and/or inside the base material layer 1. The additives may be used alone, or may be used in combination of two or more thereof.

In the present disclosure, it is preferable that a lubricant is present on the surface of the base material layer 1 from the viewpoint of enhancing the moldability of the exterior material for an all-solid-state battery. The lubricant is not particularly limited, and is preferably an amide-based lubricant. Specific examples of the amide-based lubricant include saturated fatty acid amides, unsaturated fatty acid amides, substituted amides, methylol amides, saturated fatty acid bisamides, unsaturated fatty acid bisamides, fatty acid ester amides, and aromatic bisamides. Specific examples of the saturated fatty acid amide include lauric acid amide, palmitic acid amide, stearic acid amide, behenic acid amide, and hydroxystearic acid amide. Specific examples of unsaturated fatty acid amide include oleic acid amide and erucic acid amide. Specific examples of the substituted amide include N-oleylpalmitic acid amide, N-stearyl stearic acid amide, N-stearyl oleic acid amide, N-oleyl stearic acid amide, and N-stearyl erucic acid amide. Specific examples of the methylolamide include methylolstearic acid amide. Specific examples of the saturated fatty acid bisamide include methylenebisstearic acid amide, ethylenebiscapric acid amide, ethylenebislauric acid amide, ethylenebisstearic acid amide, ethylenebishydroxystearic acid amide, ethylenebisbehenic acid amide, hexamethylenebisstearic acid amide, hexamethylenehydroxystearic acid amide, N,N'-distearyl adipic acid amide, and N,N'-distearyl sebacic acid amide. Specific examples of the unsaturated fatty acid bisamide include ethylenebisoleic acid amide, ethylenebiserucic acid amide, hexamethylenebisoleic acid amide, N,N'-dioleyladipic acid amide, and N,N'-dioleylsebacic acid amide. Specific examples of the fatty acid ester amide include stearoamide-ethyl stearate. Specific examples of the aromatic bisamide include m-xylylenebisstearic acid amide, m-xylylenebishydroxystearic acid amide, and N,N'-distearylisophthalic acid amide. The lubricants may be used alone, or may be used in combination of two or more thereof.

When the lubricant is present on the surface of the base material layer 1, the amount of the lubricant present is not particularly limited, and is preferably about 3 mg/m$^2$ or more, more preferably about 4 to 15 mg/m$^2$, still more preferably about 5 to 14 mg/m$^2$.

The lubricant present on the surface of the base material layer 1 may be one obtained by exuding the lubricant contained in the resin forming the base material layer 1, or one obtained by applying the lubricant to the surface of the base material layer 1.

The thickness of the base material layer 1 is not particularly limited as long as a function as a base material is performed, and the thickness of the base material layer 1 is, for example, about 3 to 50 µm, preferably about 10 to 35 µm. When the base material layer 1 is a resin film laminate with two or more layers, the thickness of the resin film forming each layer is preferably about 2 to 25 µm. When the base material layer 1 is a layer having a buffering function, the thickness of the base material layer 1 is a thickness as described in the section [Buffer Layer 6] above.

[Adhesive Agent Layer 2]

In the exterior material for an all-solid-state battery according to the present disclosure, the adhesive agent layer 2 is a layer provided between the base material layer 1 and the barrier layer 3 if necessary for the purpose of enhancing bondability between these layers.

The adhesive agent layer 2 is formed from an adhesive capable of bonding the base material layer 1 and the barrier layer 3. The adhesive used for forming the adhesive agent layer 2 is not limited, and may be any of a chemical reaction type, a solvent volatilization type, a heat melting type, a heat pressing type, and the like. The adhesive agent may be a two-liquid curable adhesive (two-liquid adhesive), a one-liquid curable adhesive (one-liquid adhesive), or a resin that does not involve curing reaction. The adhesive agent layer 2 may be a single layer or a multi-layer.

Specific examples of the adhesive component contained in the adhesive include polyester resins such as polyethylene terephthalate, polybutylene terephthalate, polyethylene naphthalate, polybutylene naphthalate, polyethylene isophthalate and copolyester; polyether; polyurethane; epoxy resins; phenol resins; polyamides such as nylon 6, nylon 66, nylon 12 and copolymerized polyamide; polyolefin-based resins such as polyolefins, cyclic polyolefins, acid-modified polyolefins and acid-modified cyclic polyolefins; cellulose; (meth)acrylic resins; polyimide; polycarbonate; amino resins such as urea resins and melamine resins; rubbers such as chloroprene rubber, nitrile rubber and styrene-butadiene rubber; and silicone resins. These adhesive components may be used alone, or may be used in combination of two or more thereof. Of these adhesive components, polyurethane-based adhesives are preferable. In addition, the adhesive strength of these resins used as adhesive components can be increased by using an appropriate curing agent in combination. As the curing agent, appropriate one is selected from polyisocyanate, a polyfunctional epoxy resin, an oxazoline group-containing polymer, a polyamine resin, an acid anhydride and the like according to the functional group of the adhesive component.

Examples of the polyurethane adhesive include polyurethane adhesives containing a main agent containing a polyol compound and a curing agent containing an isocyanate compound. The polyurethane adhesive is preferably a two-liquid curable polyurethane adhesive having polyol such as polyester polyol, polyether polyol or acrylic polyol as a main agent, and aromatic or aliphatic polyisocyanate as a curing agent. Preferably, polyester polyol having a hydroxyl group in the side chain in addition to a hydroxyl group at the end of the repeating unit is used as the polyol compound.

Other components may be added to the adhesive agent layer 2 as long as bondability is not inhibited, and the adhesive agent layer 2 may contain a colorant, a thermoplastic elastomer, a tackifier, a filler, and the like. When the adhesive agent layer 2 contains a colorant, the exterior material for an all-solid-state battery can be colored. As the colorant, known colorants such as pigments and dyes can be used. The colorants may be used alone, or may be used in combination of two or more thereof.

The type of pigment is not particularly limited as long as the bondability of the adhesive agent layer 2 is not impaired. Examples of the organic pigment include azo-based pigments, phthalocyanine-based pigments, quinacridone-based pigments, anthraquinone-based pigments, dioxazine-based pigments, indigothioindigo-based pigments, perinone-perylene-based pigments, isoindolenine-based pigments and benzimidazolone-based pigments. Examples of the inorganic pigment include carbon black-based pigments, titanium oxide-based pigments, cadmium-based pigments, lead-based pigments, chromium-based pigments and iron-based pigments, and also fine powder of mica (mica) and fish scale foil.

Of the colorants, carbon black is preferable for the purpose of, for example, blackening the appearance of the exterior material for an all-solid-state battery.

The average particle diameter of the pigment is not particularly limited, and is, for example, about 0.05 to 5 µm, preferably about 0.08 to 2 µm. The average particle size of the pigment is a median diameter measured by a laser diffraction/scattering particle size distribution measuring apparatus.

The content of the pigment in the adhesive agent layer 2 is not particularly limited as long as the exterior material for an all-solid-state battery is colored, and the content is, for example, about 5 to 60 mass %, preferably 10 to 40 mass %.

The thickness of the adhesive agent layer 2 is not particularly limited as long as the base material layer 1 and the barrier layer 3 can be bonded to each other, and for example, the thickness is about 1 µm or more, or about 2 µm or more, and about 10 µm or less, or about 5 µm or less, and is preferably in the range of about 1 to 10 µm, about 1 to 5 µm, about 2 to 10 µm, or about 2 to 5 µm.

[Colored Layer]

The colored layer is a layer provided between the base material layer 1 and the barrier layer 3 if necessary (not shown). When the adhesive agent layer 2 is present, the colored layer may be provided between the base material layer 1 and the adhesive agent layer 2 or between the adhesive agent layer 2 and the barrier layer 3. The colored layer may be provided on the outside of the base material layer 1. By providing the colored layer, the exterior material for an all-solid-state battery can be colored.

The colored layer can be formed by, for example, applying an ink containing a colorant to the surface of the base material layer 1, the surface of the adhesive agent layer 2, or the surface of the barrier layer 3. As the colorant, known colorants such as pigments and dyes can be used. The colorants may be used alone, or may be used in combination of two or more thereof.

Specific examples of the colorant contained in the colored layer include the same colorants as those exemplified in the section [Adhesive agent Layer 2].

[Barrier Layer 3]

In the exterior material for an all-solid-state battery, the barrier layer 3 is a layer which suppresses at least ingress of moisture.

Examples of the barrier layer 3 include metal foils, deposited films and resin layers having a barrier property. Examples of the deposited film include metal deposited films, inorganic oxide deposited films and carbon-containing inorganic oxide deposited films, and examples of the resin layer include those of polyvinylidene chloride, fluorine-containing resins such as polymers containing chlorotrifluoroethylene (CTFE) as a main component, polymers containing tetrafluoroethylene (TFE) as a main component, polymers having a fluoroalkyl group, and polymers containing a fluoroalkyl unit as a main component, and ethylene vinyl alcohol copolymers. Examples of the barrier layer 3 include resin films provided with at least one of these deposited films and resin layers. A plurality of barrier layers 3 may be provided. Preferably, the barrier layer 3 contains a layer formed of a metal material. Specific examples of the metal material forming the barrier layer 3 include aluminum alloys, stainless steel, titanium steel and steel sheets. When the metal material is used as a metal foil, it is preferable that the metal material includes at least one of an aluminum alloy foil and a stainless steel foil.

The aluminum alloy is more preferably a soft aluminum alloy foil formed of, for example, an annealed aluminum alloy from the viewpoint of improving the moldability of the exterior material for an all-solid-state battery, and is preferably an aluminum alloy foil containing iron from the viewpoint of further improving the moldability. In the aluminum alloy foil containing iron (100 mass %), the content of iron is preferably 0.1 to 9.0 mass %, more preferably 0.5 to 2.0 mass %. When the content of iron is 0.1 mass % or more, it is possible to obtain an exterior material for an all-solid-state battery which has more excellent moldability. When the content of iron is 9.0 mass % or less, it is possible to obtain an exterior material for an all-solid-state battery which is more excellent in moldability. Examples of the soft aluminum alloy foil include aluminum alloy foils having a composition specified in JIS H4160: 1994 A8021H-O, JIS H4160: 1994 A8079H-O, JIS H4000: 2014 A8021P-O, or JIS H4000: 2014 A8079P-O. If necessary, silicon, magnesium, copper, manganese or the like may be added. Softening can be performed by annealing or the like.

Examples of the stainless steel foil include austenitic stainless steel foils, ferritic stainless steel foils, austenitic/ferritic stainless steel foils, martensitic stainless steel foils and precipitation-hardened stainless steel foils. From the viewpoint of providing an exterior material for an all-solid-state battery which is further excellent in moldability, it is preferable that the stainless steel foil is formed of austenitic stainless steel.

Specific examples of the austenite-based stainless steel foil include SUS 304 stainless steel, SUS 301 stainless steel and SUS 316L stainless steel, and of these, SUS 304 stainless steel is especially preferable.

When the barrier layer 3 is a metal foil, the barrier layer 3 may perform a function as a barrier layer suppressing at least ingress of moisture, and has a thickness of, for example, about 9 to 200 µm. For example, the thickness of the barrier layer 3 is preferably about 85 µm or less, more preferably about 50 µm or less, still more preferably about 40 µm or less, especially preferably about 35 µm or less, and preferably about 10 µm or more, more preferably about 20 µm or more, still more preferably about 25 µm or more. The thickness is preferably in the range of about 10 to 85 µm, about 10 to 50 µm, about 10 to 40 µm, about 10 to 35 µm, about 20 to 85 µm, about 20 to 50 µm, about 20 to 40 µm, about 20 to 35 µm, about 25 to 85 µm, about 25 to 50 µm, about 25 to 40 µm, or about 25 to 35 µm. When the bather layer 3 is composed of an aluminum alloy foil, the thickness thereof is especially preferably in the above-described range, particularly 25 to 85 µm or about 25 to 50 µm are particularly preferable. Particularly, when the barrier layer 3 is formed of a stainless steel foil, the thickness of the stainless steel foil is preferably about 60 µm or less, more preferably about 50 µm or less, still more preferably about 40 µm or less, even more preferably about 30 µm or less, especially preferably about 25 µm or less, and preferably about 10 µm or more, more preferably about 15 µm or more. The thickness is about preferably in the range of about 10 to 60 µm, about 10 to 50 µm, about 10 to 40 µm, about 10 to 30 µm, about 10 to 25 µm, about 15 to 60 µm, about 15 to 50 µm, about 15 to 40 µm, about 15 to 30 µm, or about 15 to 25 µm.

When the barrier layer 3 is a metal foil, it is preferable that a corrosion-resistant film is provided at least on a surface on a side opposite to the base material layer for preventing dissolution and corrosion by corrosive gas generated from the solid electrolyte. The barrier layer 3 may include a corrosion-resistant film on each of both surfaces. Here, the corrosion-resistant film refers to a thin film obtained by subjecting the surface of the barrier layer to, for example, hydrothermal denaturation treatment such as boehmite treatment, chemical conversion treatment, anodization treatment, plating treatment with nickel, chromium or the like, or corrosion prevention treatment by applying a coating agent to impart corrosion resistance to the barrier layer. One of treatments for forming the corrosion-resistant film may be performed, or two or more thereof may be performed in combination. In addition, not only one layer but also multiple layers can be formed. Further, of these treatments, the hydrothermal denaturation treatment and the anodization treatment are treatments in which the surface of the metal foil is dissolved with a treatment agent to form a metal compound excellent in corrosion resistance. The definition of the chemical conversion treatment may include these treatments. When the barrier layer 3 is provided with the corrosion-resistant film, the barrier layer 3 is regarded as including the corrosion-resistant film.

The corrosion-resistant film exhibits the effects of preventing delamination between the barrier layer (e.g. an aluminum alloy foil) and the base material layer during molding of the exterior material for an all-solid-state battery; preventing dissolution and corrosion of the surface of the barrier layer by corrosive gas generated from the solid electrolyte, particularly dissolution and corrosion of aluminum oxide present on the surface of the barrier layer when the barrier layer is an aluminum alloy foil; improving the bondability (wettability) of the surface of the barrier layer; preventing delamination between the base material layer and the barrier layer during heat-sealing; and preventing delamination between the base material layer and the barrier layer during molding.

Various corrosion-resistant films formed by chemical conversion treatment are known, and examples thereof include mainly corrosion-resistant films containing at least one of a phosphate, a chromate, a fluoride, a triazine thiol compound, and a rare earth oxide. Examples of the chemical conversion treatment using a phosphate or a chromate include chromic acid chromate treatment, phosphoric acid chromate treatment, phosphoric acid-chromate treatment and chromate treatment, and examples of the chromium compound used in these treatments include chromium nitrate, chromium fluoride, chromium sulfate, chromium acetate, chromium oxalate, chromium biphosphate, acetylacetate chromate, chromium chloride and chromium potassium sulfate. Examples of the phosphorus compound used in these treatments include sodium phosphate, potassium phosphate, ammonium phosphate and polyphosphoric acid. Examples of the chromate treatment include etching chromate treatment, electrolytic chromate treatment and coating-type chromate treatment, and coating-type chromate treatment is preferable. This coating-type chromate treatment is treatment in which at least a surface of the barrier layer (e.g. an aluminum alloy foil) on the inner layer side is first degreased by a well-known treatment method such as an alkali immersion method, an electrolytic cleaning method, an acid cleaning method, an electrolytic acid cleaning method or an acid activation method, and a treatment solution containing a metal phosphate such as Cr (chromium) phosphate, Ti (titanium) phosphate, Zr (zirconium) phosphate or Zn (zinc) phosphate or a mixture of these metal salts as a main component, a treatment solution containing any of non-metal salts of phosphoric acid and a mixture of these non-metal salts as a main component, or a treatment solution formed of a mixture of any of these salts and a synthetic resin or the like is then applied to the degreased surface by a well-known coating method such as a roll coating method, a gravure printing method or an immersion method, and dried. As the treatment liquid, for example, various solvents such as water, an alcohol-based solvent, a hydrocarbon-based solvent, a ketone-based solvent, an ester-based solvent, and an ether-based solvent can be used, and water is preferable. Examples of the resin component used here include polymers such as phenol-based resins and acryl-based resins, and examples of the treatment include chromate treatment using an aminated phenol polymer having any of repeating units represented by the following general formulae (1) to (4). In the aminated phenol polymer, the repeating units represented by the following general formulae (1) to (4) may be contained alone, or may be contained in combination of two or more thereof. The acryl-based resin is preferably polyacrylic acid, an acrylic acid-methacrylic acid ester copolymer, an acrylic acid-maleic acid copolymer, an acrylic acid-styrene copolymer, or a derivative thereof such as a sodium salt, an ammonium salt or an amine salt thereof. In particular, a derivative of polyacrylic acid such as an ammonium salt, a sodium salt or an amine salt of polyacrylic acid is preferable. In the present disclosure, the polyacrylic acid means a polymer of acrylic acid. The acryl-based resin is also preferably a copolymer of acrylic acid and dicarboxylic acid or dicarboxylic anhydride, and is also preferably an ammonium salt, a sodium salt or an amine salt of a copolymer of acrylic acid and dicarboxylic acid or dicarboxylic anhydride. The acryl-based resins may be used alone, or may be used in combination of two or more thereof.

[Chemical Formula 1]

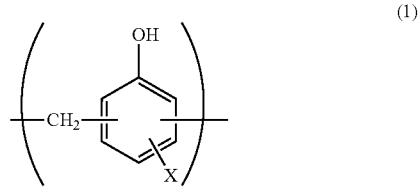

[Chemical Formula 2]

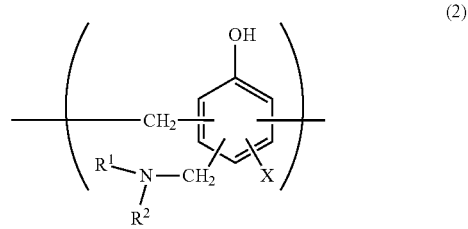

[Chemical Formula 3]

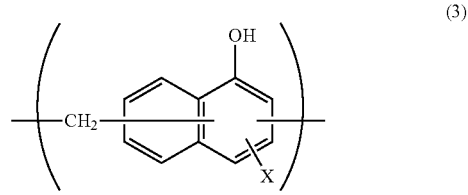

[Chemical Formula 4]

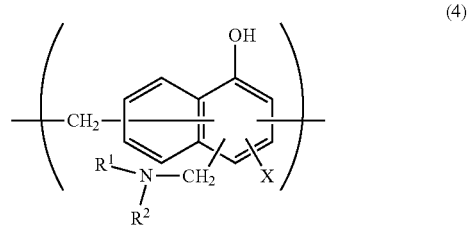

In the general formulae (1) to (4), X represents a hydrogen atom, a hydroxy group, an alkyl group, a hydroxyalkyl group, an allyl group, or a benzyl group. $R^1$ and $R^2$ are the same or different, and each represents a hydroxy group, an alkyl group, or a hydroxyalkyl group. In the general formulae (1) to (4), examples of the alkyl group represented by X, $R^1$ and $R^2$ include linear or branched alkyl groups with a carbon number of 1 to 4, such as a methyl group, an ethyl group, a n-propyl group, an isopropyl group, a n-butyl group, an isobutyl group, and a tert-butyl group. Examples of the hydroxyalkyl group represented by X, $R^1$ and $R^2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group, and a 4-hydroxybutyl group. In the general formulae (1) to (4), the alkyl group and the hydroxyalkyl group represented by X, $R^1$ and $R^2$ may be the same or different. In the general formulae (1) to (4), X is preferably a hydrogen atom, a hydroxy group or a hydroxyalkyl group. A number average molecular weight of the aminated phenol polymer having repeating units represented by the general formulae (1) to (4) is preferably about 500 to 1,000,000, and more preferably about 1,000 to 20,000, for example. The aminated phenol polymer is produced by, for example, performing polycondensation of a phenol compound or a naphthol compound with formaldehyde to prepare a polymer including repeating units represented by the general formula (1) or the general formula (3), and then introducing a functional group ($-CH_2NR'R^2$) into the obtained polymer using formaldehyde and an amine ($R'R^2NH$). The aminated phenol polymers are used alone, or used in combination of two or more thereof.

Other examples of the corrosion-resistant film include thin films formed by corrosion prevention treatment of coating type in which a coating agent containing at least one selected from the group consisting of a rare earth element oxide sol, an anionic polymer and a cationic polymer is applied. The coating agent may further contain phosphoric acid or a phosphate, and a crosslinker for crosslinking the polymer. In the rare earth element oxide sol, fine particles of a rare earth element oxide (e.g. particles having an average particle diameter of 100 nm or less) are dispersed in a liquid dispersion medium. Examples of the rare earth element oxide include cerium oxide, yttrium oxide, neodymium oxide and lanthanum oxide, and cerium oxide is preferable from the viewpoint of further improving adhesion. The rare earth element oxides contained in the corrosion-resistant film can be used alone, or used in combination of two or more thereof. As the liquid dispersion medium for the rare earth element oxide, for example, various solvents such as water, an alcohol-based solvent, a hydrocarbon-based solvent, a ketone-based solvent, an ester-based solvent, and an ether-based solvent can be used, and water is preferable. For example, the cationic polymer is preferably polyethyleneimine, an ion polymer complex formed of a polymer having polyethyleneimine and a carboxylic acid, primary amine-grafted acrylic resins obtained by graft-polymerizing a primary amine with an acrylic main backbone, polyallylamine or a derivative thereof, or aminated phenol. The anionic polymer is preferably poly (meth)acrylic acid or a salt thereof, or a copolymer containing (meth)acrylic acid or a salt thereof as a main component. The crosslinker is preferably at least one selected from the group consisting of a silane coupling agent and a compound having any of functional groups including an isocyanate group, a glycidyl group, a carboxyl group and an oxazoline group. In addition, the phosphoric acid or phosphate is preferably condensed phosphoric acid or a condensed phosphate.

Examples of the corrosion-resistant film include films formed by applying a dispersion of fine particles of a metal oxide such as aluminum oxide, titanium oxide, cerium oxide or tin oxide or barium sulfate in phosphoric acid to the surface of the barrier layer and performing baking treatment at 150° C. or higher.

The corrosion-resistant film may have a laminated structure in which at least one of a cationic polymer and an anionic polymer is further laminated if necessary. Examples of the cationic polymer and the anionic polymer include those described above.

The composition of the corrosion-resistant film can be analyzed by, for example, time-of-flight secondary ion mass spectrometry.

The amount of the corrosion-resistant film to be formed on the surface of the barrier layer 3 in the chemical conversion treatment is not particularly limited, but for example when the coating-type chromate treatment is performed, and it is desirable that the chromic acid compound be contained in an amount of, for example, about 0.5 to 50 mg, preferably about 1.0 mg to 40 mg, in terms of chromium, the phosphorus compound be contained in an amount of, for example, about 0.5 to 50 mg, preferably about 1.0 to 40 mg, in terms of phosphorus, and the aminated phenol polymer be contained in an amount of, for example, about 1.0 to 200 mg, preferably about 5.0 mg to 150 mg, per 1 $m^2$ of the surface of the barrier layer 3.

The thickness of the corrosion-resistant film is not particularly limited, and is preferably about 1 nm to 20 μm, more preferably about 1 nm to 100 nm, still more preferably about 1 nm to 50 nm from the viewpoint of the cohesive force of the film and the adhesive strength with the barrier layer and the heat-sealable resin layer. The thickness of the corrosion-resistant film can be measured by observation with a transmission electron microscope or a combination of observation with a transmission electron microscope and energy dispersive X-ray spectroscopy or electron beam energy loss spectroscopy. By analyzing the composition of the corrosion-resistant film using time-of-flight secondary ion mass spectrometry, peaks derived from secondary ions from, for example, Ce, P and O (e.g. at least one of $Ce_2PO_4^+$, $CePO_4^-$ and the like) and secondary ions from, for example, Cr, P and O (e.g. at least one of $CrPO_2^+$, $CrPO_4^-$ and the like) are detected.

The chemical conversion treatment is performed in the following manner: a solution containing a compound to be used for formation of a corrosion-resistant film is applied to the surface of the barrier layer by a bar coating method, a roll coating method, a gravure coating method, an immersion method or the like, and heating is then performed so that the temperature of the barrier layer is about 70 to 200° C. or less. The barrier layer may be subjected to a degreasing treatment by an alkali immersion method, an electrolytic cleaning method, an acid cleaning method, an electrolytic acid cleaning method or the like before the barrier layer is subjected to a chemical conversion treatment. When a degreasing treatment is performed as described above, the chemical conversion treatment of the surface of the barrier layer can be further efficiently performed. When an acid degreasing agent with a fluorine-containing compound dissolved in an inorganic acid is used for degreasing treatment, not only a metal foil degreasing effect can be obtained but also a metal fluoride can be formed, and in this case, only degreasing treatment may be performed.

[Heat-Sealable Resin Layer 4]

In the exterior material for an all-solid-state battery according to the present disclosure, the heat-sealable resin layer 4 is a layer (sealant layer) that corresponds to an innermost layer and performs a function of hermetically sealing the battery element with the heat-sealable resin layers 4 heat-sealed to each other during construction of the all-solid-state battery.

The resin forming the heat-sealable resin layer 4 is not particularly limited as long as it can be heat-sealed, a resin containing a polyolefin skeleton such as a polyolefin or an acid-modified polyolefin is preferable. The resin forming the heat-sealable resin layer 4 can be confirmed to contain a polyolefin backbone by an analysis method such as infrared spectroscopy or gas chromatography-mass spectrometry. In addition, it is preferable that a peak derived from maleic anhydride is detected when the resin forming the heat-sealable resin layer 4 is analyzed by infrared spectroscopy. For example, when a maleic anhydride-modified polyolefin is measured by infrared spectroscopy, peaks derived from maleic anhydride are detected near wavenumbers of 1760 $cm^{-1}$ and 1780 $cm^{-1}$. When the heat-sealable resin layer 4 is a layer formed of a maleic anhydride-modified polyolefin, a peak derived from maleic anhydride is detected when measurement is performed by infrared spectroscopy. However, if the degree of acid modification is low, the peaks may be too small to be detected. In that case, the peaks can be analyzed by nuclear magnetic resonance spectroscopy.

Specific examples of the polyolefin to be acid-modified include polyethylenes such as low-density polyethylene, medium-density polyethylene, high-density polyethylene and linear low-density polyethylene; ethylene-α-olefin copolymers; polypropylene such as homopolypropylene, block copolymers of polypropylene (e.g., block copolymers of propylene and ethylene) and random copolymers of polypropylene (e.g., random copolymers of propylene and ethylene); propylene-α-olefin copolymers; and terpolymers of ethylene-butene-propylene. Among them, polypropylene is preferable. The polyolefin resin in the case of a copolymer may be a block copolymer or a random copolymer. These polyolefin-based resins may be used alone, or may be used in combination of two or more thereof.

The polyolefin may be a cyclic polyolefin. The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene; cyclic dienes such as cyclopentadiene, dicyclopentadiene, cyclohexadiene and norbornadiene. Among these polyolefins, cyclic alkenes are preferable, and norbornene is more preferable.

The acid-modified polyolefin is a polymer with the polyolefin modified by subjecting the polyolefin to block polymerization or graft polymerization with an acid component. As the polyolefin to be acid-modified, the above-mentioned polyolefins, copolymers obtained by copolymerizing polar molecules such as acrylic acid or methacrylic acid with the above-mentioned polyolefins, polymers such as crosslinked polyolefins, or the like can also be used. Examples of the acid component to be used for acid modification include carboxylic acids such as maleic acid, acrylic acid, itaconic acid, crotonic acid, maleic anhydride and itaconic anhydride, and anhydrides thereof.

The acid-modified polyolefin may be an acid-modified cyclic polyolefin. The acid-modified cyclic polyolefin is a polymer obtained by copolymerizing a part of monomers forming the cyclic polyolefin in place of an acid component, or block-polymerizing or graft-polymerizing an acid component with the cyclic polyolefin. The cyclic polyolefin to be modified with an acid is the same as described above. The acid component to be used for acid modification is the same as the acid component used for modification of the polyolefin.

Examples of preferred acid-modified polyolefins include polyolefins modified with a carboxylic acid or an anhydride thereof, polypropylene modified with a carboxylic acid or an anhydride thereof, maleic anhydride-modified polyolefins, and maleic anhydride-modified polypropylene.

It is also preferable that the heat-sealable resin layer 4 is formed from a polybutylene terephthalate film. The polybutylene terephthalate film may be a stretched polybutylene terephthalate film or an unstretched polybutylene terephthalate film, and is preferably an unstretched polybutylene terephthalate film. The polybutylene terephthalate film that forms the heat-sealable resin layer 4 may be formed into the heat-sealable resin layer 4 by laminating a polybutylene terephthalate film prepared in advance with the barrier layer 3, the adhesive layer 5 and the like, or may be formed into a film by melt-extruding a resin for forming the polybutylene terephthalate film and laminated with the barrier layer 3, the adhesive layer 5 and the like.

The heat-sealable resin layer 4 may be formed from one resin alone, or may be formed from a blend polymer obtained by combining two or more resins. Further, the heat-sealable resin layer 4 may be composed of only one layer, or may be composed of two or more layers with the same resin component or different resin components. When the heat-sealable resin layer 4 is composed of two or more layers, for example, at least one layer is preferably formed from a polybutylene terephthalate film, and the polybutylene terephthalate film is preferably an innermost layer. When the heat-sealable resin layer 4 is formed from two or more layers, the layer which is not formed from a polybutylene terephthalate film may be, for example, a layer formed from a polyolefin such as polypropylene or polyethylene, an acid-modified polyolefin such as acid-modified polypropylene or acid-modified polyethylene, or the like. When the heat-sealable resin layer 4 is composed of two or more layers, at least the layer forming the innermost layer of the exterior material 10 for an all-solid-state battery, among the two or more heat-sealable resin layers 4, is preferably a polybutylene terephthalate film. At least the layer which is in contact with the adhesive layer 5 is preferably a polybutylene terephthalate film.

The heat-sealable resin layer 4 may contain a lubricant etc. if necessary. When the heat-sealable resin layer 4 contains a lubricant, the moldability of the exterior material for an all-solid-state battery can be improved. The lubricant is not particularly limited, and a known lubricant can be used. The lubricants may be used alone, or may be used in combination of two or more thereof.

The lubricant is not particularly limited, and is preferably an amide-based lubricant. Specific examples of the lubricant include those exemplified for the base material layer 1. The lubricants may be used alone, or may be used in combination of two or more thereof.

When a lubricant is present on the surface of the heat-sealable resin layer 4, the amount of the lubricant present is not particularly limited, and is preferably about 10 to 50 $mg/m^2$, more preferably about 15 to 40 $mg/m^2$ from the viewpoint of improving the moldability of the electron packaging material.

The lubricant present on the surface of the heat-sealable resin layer 4 may be one obtained by exuding the lubricant contained in the resin forming the heat-sealable resin layer 4, or one obtained by applying a lubricant to the surface of the heat-sealable resin layer 4.

The thickness of the heat-sealable resin layer 4 is not particularly limited as long as the heat-sealable resin layers are heat-sealed to each other to perform a function of sealing the battery element, and the thickness is, for example, about 100 μm or less, preferably about 85 μm or less, more preferably about 15 to 85 μm. For example, when the thickness of the adhesive layer 5 described later is 10 μm or more, the thickness of the heat-sealable resin layer 4 is preferably about 85 μm or less, more preferably about 15 to 45 μm. For example, when the thickness of the adhesive layer 5 described later is less than 10 μm or the adhesive layer 5 is not provided, the thickness of the heat-sealable resin layer 4 is preferably about 20 μm or more, more preferably about 35 to 85 μm.

[Adhesive Layer 5]

In the exterior material for an all-solid-state battery according to the present disclosure, the adhesive layer 5 is a layer provided between the barrier layer 3 (or corrosion-resistant film) and the heat-sealable resin layer 4 if necessary for firmly bonding these layers to each other.

The adhesive layer 5 is formed from a resin capable of bonding the barrier layer 3 and the heat-sealable resin layer 4 to each other. The resin to be used for forming the adhesive layer 5 is, for example, the same as that of the adhesive exemplified for the adhesive agent layer 2. Preferably, the resin to be used for forming the adhesive layer 5 contains a polyolefin backbone. Examples thereof include the polyolefins and acid-modified polyolefins exemplified for the heat-sealable resin layer 4 described above. The resin forming the adhesive layer 5 can be confirmed to contain a polyolefin backbone by an analysis method such as infrared spectroscopy or gas chromatography-mass spectrometry, and the analysis method is not particularly limited. In addition, it is preferable that a peak derived from maleic anhydride is detected when the resin forming the adhesive layer 5 is analyzed by infrared spectroscopy. For example, when a maleic anhydride-modified polyolefin is measured by infrared spectroscopy, peaks derived from maleic anhydride are detected near wavenumbers of 1760 $cm^{-1}$ and 1780 $cm^{-1}$. However, if the degree of acid modification is low, the peaks may be too small to be detected. In that case, the peaks can be analyzed by nuclear magnetic resonance spectroscopy.

From the viewpoint of firmly bonding the barrier layer 3 and the heat-sealable resin layer 4 to each other, it is preferable that the adhesive layer 5 contains an acid-modified polyolefin. As the acid-modified polyolefin, polyolefins modified with a carboxylic acid or an anhydride thereof, polypropylene modified with a carboxylic acid or an anhydride thereof, maleic anhydride-modified polyolefins, and maleic anhydride-modified polypropylene is especially preferable.

Further, from the viewpoint of obtaining an exterior material for an all-solid-state battery which is excellent in shape stability after molding while having a small thickness, the adhesive layer 5 is more preferably a cured product of a resin composition containing an acid-modified polyolefin and a curing agent. Preferred examples of the acid-modified polyolefin include those described above.

The adhesive layer 5 is preferably a cured product of a resin composition containing an acid-modified polyolefin and at least one selected from the group consisting of a compound having an isocyanate group, a compound having an oxazoline group, and a compound having an epoxy group, especially preferably a cured product of a resin composition containing an acid-modified polyolefin and at least one selected from the group consisting of a compound having an isocyanate group and a compound having an epoxy group. Preferably, the adhesive layer 5 preferably contains at least one selected from the group consisting of polyurethane, polyester and epoxy resin. More preferably, the adhesive layer 5 contains polyurethane and epoxy resin. As the polyester, for example, an amide ester resin is preferable. The amide ester resin is generally produced by reaction of a carboxyl group with an oxazoline group. The adhesive layer 5 is more preferably a cured product of a resin composition containing at least one of these resins and the acid-modified polyolefin. When an unreacted substance of a curing agent, such as a compound having an isocyanate group, a compound having an oxazoline group, or an epoxy resin remains in the adhesive layer 5, the presence of the unreacted substance can be confirmed by, for example, a method selected from infrared spectroscopy, Raman spectroscopy, time-of-flight secondary ion mass spectrometry (TOF-SIMS) and the like.

From the viewpoint of further improving adhesion between the barrier layer 3 and the adhesive layer 5, the adhesive layer 5 is preferably a cured product of a resin composition containing a curing agent having at least one selected from the group consisting of an oxygen atom, a heterocyclic ring, a C=N bond, and a C—O—C bond. Examples of the curing agent having a heterocyclic ring include curing agents having an oxazoline group, and curing agents having an epoxy group. Examples of the curing agent having a C=N bond include curing agents having an oxazoline group and curing agents having an isocyanate group. Examples of the curing agent having a C—O—C bond include curing agents having an oxazoline group, curing agents having an epoxy group, and polyurethane. Whether the adhesive layer 5 is a cured product of a resin composition containing any of these curing agents can be confirmed by, for example, a method such as gas chromatography-mass spectrometry (GCMS), infrared spectroscopy (IR), time-of-flight secondary ion mass spectrometry (TOF-SIMS), or X-ray photoelectron spectroscopy (XPS).

The compound having an isocyanate group is not particularly limited, and is preferably a polyfunctional isocyanate compound from the viewpoint of effectively improving adhesion between the barrier layer 3 and the adhesive layer 5. The polyfunctional isocyanate compound is not particularly limited as long as it is a compound having two or more isocyanate groups. Specific examples of the polyfunctional isocyanate-based curing agent include pentane diisocyanate (PDI), isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymers of these compounds with other polymers. Examples thereof include adduct forms, biuret forms, and isocyanurate forms.

The content of the compound having an isocyanate group in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5.

The compound having an oxazoline group is not particularly limited as long as it is a compound having an oxazoline backbone. Specific examples of the compound having an oxazoline group include compounds having a polystyrene main chain and compounds having an acrylic main chain. Examples of the commercially available product include EPOCROS series manufactured by Nippon Shokubai Co., Ltd.

The proportion of the compound having an oxazoline group in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5.

Examples of the compound having an epoxy group include epoxy resins. The epoxy resin is not particularly limited as long as it is a resin capable of forming a crosslinked structure by epoxy groups existing in the molecule, and a known epoxy resin can be used. The weight average molecular weight of the epoxy resin is preferably about 50 to 2000, more preferably about 100 to 1000, still more preferably about 200 to 800. In the present invention, the weight average molecular weight of the epoxy resin is a value obtained by performing measurement by gel permeation chromatography (GPC) under the condition of using polystyrene as a standard sample.

Specific examples of the epoxy resin include glycidyl ether derivatives of trimethylolpropane, bisphenol A diglycidyl ether, modified bisphenol A diglycidyl ether, novolak glycidyl ether, glycerin polyglycidyl ether and polyglycerin polyglycidyl ether. The epoxy resins may be used alone, or may be used in combination of two or more thereof.

The proportion of the epoxy resin in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5.

The polyurethane is not particularly limited, and a known polyurethane can be used. The adhesive layer 5 may be, for example, a cured product of two-liquid curable polyurethane.

The proportion of the polyurethane in the adhesive layer 5 is preferably in the range of 0.1 to 50 mass %, more preferably in the range of 0.5 to 40 mass % in the resin composition forming the adhesive layer 5.

When the adhesive layer 5 is a cured product of a resin composition containing at least one selected from the group consisting of a compound having an isocyanate group, a compound having an oxazoline group and an epoxy resin, and the acid-modified polyolefin, the acid-modified polyolefin functions as a main agent, and the compound having an isocyanate group, the compound having an oxazoline group, and the compound having an epoxy group each function as a curing agent.

The thickness of the adhesive layer 5 is preferably about 50 μm or less, about 40 μm or less, about 30 μm or less, about 20 μm or less, or about 5 μm or less, and preferably about 0.1 μm or more or about 0.5 μm or more. The thickness is preferably about 0.1 to 50 μm, about 0.1 to 40 μm, about 0.1 to 30 μm, about 0.1 to 20 μm, about 0.1 to 5 μm, about 0.5 to 50 μm, about 0.5 to 40 μm, about 0.5 to 30 μm, about 0.5 to 20 μm, or about 0.5 to 5 μm. More specifically, the thickness is preferably about 1 to 10 μm, more preferably about 1 to 5 μm when the adhesive exemplified for the adhesive agent layer 2 or a cured product of an acid-modified polyolefin and a curing agent. When any of the resins exemplified for the heat-sealable resin layer 4 is used, the thickness of the adhesive layer is preferably about 2 to 50 μm, more preferably about 10 to 40 μm. When the adhesive layer 5 is a cured product of a resin composition containing the adhesive exemplified for the adhesive agent layer 2 or an acid-modified polyolefin and a curing agent, the adhesive layer 5 can be formed by, for example, applying the resin composition and curing the resin composition by heating or the like. When the resin exemplified for the heat-sealable resin layer 4 is used, for example, extrusion molding of the heat-sealable resin layer 4 and the adhesive layer 5 can be performed.

[Surface Coating Layer]

The exterior material of the present disclosure may include a surface coating layer on the base material layer 1 (on the base material layer 1 on a side opposite to the barrier layer 3) if necessary for the purpose of improving at least one of designability, scratch resistance, moldability and the like. The surface coating layer is a layer located on the outermost layer side of the exterior material when the all-solid-state battery is constructed using the exterior material.

The surface coating layer can be formed from, for example, a resin such as polyvinylidene chloride, polyester, polyurethane, acrylic resin or epoxy resin.

When the resin forming the surface coating layer is a curable resin, the resin may be any of a one-liquid curable type and a two-liquid curable type, and is preferably a two-liquid curable type. Examples of the two-liquid curable resin include two-liquid curable polyurethane, two-liquid curable polyester and two-liquid curable epoxy resins. Of these, two-liquid curable polyurethane is preferable.

Examples of the two-liquid curable polyurethane include polyurethane which contains a main agent containing a polyol compound and a curing agent containing an isocyanate compound. The polyurethane is preferably two-liquid curable polyurethane having polyol such as polyester polyol, polyether polyol or acrylic polyol as a main agent, and aromatic or aliphatic polyisocyanate as a curing agent. Preferably, polyester polyol having a hydroxyl group in the side chain in addition to a hydroxyl group at the end of the repeating unit is used as the polyol compound.

If necessary, the surface coating layer may contain additives such as the lubricant, an anti-blocking agent, a matting agent, a flame retardant, an antioxidant, a tackifier and an anti-static agent on at least one of the surface and the inside of the surface coating layer according to the functionality and the like to be imparted to the surface coating layer and the surface thereof. The additives are in the form of, for example, fine particles having an average particle diameter of about 0.5 nm to 5 μm. The average particle diameter of the additives is a median diameter measured by a laser diffraction/scattering particle size distribution measuring apparatus.

The additives may be either inorganic substances or organic substances. The shape of the additive is not particularly limited, and examples thereof include a spherical shape, a fibrous shape, a plate shape, an amorphous shape and a scaly shape.

Specific examples of the additives include talc, silica, graphite, kaolin, montmorillonite, mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, acrylate resins, crosslinked acryl, crosslinked styrene, crosslinked polyethylene, benzoguanamine, gold, aluminum, copper and nickel. The additives may be used alone, or may be used in combination of two or more thereof. Of these additives, silica, barium sulfate and titanium oxide are preferable from the viewpoint of dispersion stability, costs, and so on. The surface of the additive may be subjected to various kinds of surface treatments such as insulation treatment and dispersibility enhancing treatment.

The method for forming the surface coating layer is not particularly limited, and examples thereof include a method in which a resin for forming the surface coating layer is applied. When the additive is added to the surface coating layer, a resin mixed with the additive may be applied.

The thickness of the surface coating layer is not particularly limited as long as the above-mentioned function as the surface coating layer is performed, and it is, for example, about 0.5 to 10 µm, preferably about 1 to 5 µm.

The method for producing an exterior material for an all-solid-state battery is not particularly limited as long as a laminate is obtained in which the layers of the exterior material for an all-solid-state battery according to the present disclosure are laminated. Examples thereof include a method including the step of laminating at least the base material layer 1, the barrier layer 3 and the heat-sealable resin layer 4 in this order from the outside.

An example of the method for producing the exterior material for an all-solid-state battery according to the present disclosure is as follows. First, a laminate including the base material layer 1, the adhesive agent layer 2 and the barrier layer 3 in this order (hereinafter, the laminate may be described as a "laminate A") is formed. Specifically, the laminate A can be formed by a dry lamination method in which an adhesive to be used for formation of the adhesive agent layer 2 is applied onto the base material layer 1 or the barrier layer 3, the surface of which is subjected to a chemical conversion treatment if necessary, using a coating method such as a gravure coating method or a roll coating method, and dried, the barrier layer 3 or the base material layer 1 is then laminated, and the adhesive agent layer 2 is cured.

Then, the heat-sealable resin layer 4 is laminated on the barrier layer 3 of the laminate A. When the heat-sealable resin layer 4 is laminated directly on the barrier layer 3, a resin component that forms the heat-sealable resin layer 4 may be applied onto the barrier layer 3 of the laminate A by a method such as a gravure coating method or a roll coating method. When the adhesive layer 5 is provided between the barrier layer 3 and the heat-sealable resin layer 4, mention is made of, for example, (1) a method in which the adhesive layer 5 and the heat-sealable resin layer 4 are co-extruded to be laminated on the barrier layer 3 of the laminate A (co-extrusion lamination method); (2) a method in which the adhesive layer 5 and the heat-sealable resin layer 4 are laminated to form a laminate separately, and the laminate is laminated on the barrier layer 3 of the laminate A by a thermal lamination method; (3) a method in which an adhesive for formation of the adhesive layer 5 is laminated on the barrier layer 3 of the laminate A by an extrusion method or a method in which the adhesive is applied by solution coating, dried at a high temperature and baked, and the heat-sealable resin layer 4 formed in a sheet shape beforehand is laminated on the adhesive layer 5 by a thermal lamination method; and (4) a method in which the melted adhesive layer 5 is poured between the barrier layer 3 of the laminate A and the heat-sealable resin layer 4 formed in a sheet shape beforehand, and simultaneously the laminate A and the heat-sealable resin layer 4 are bonded together with the adhesive layer 5 interposed therebetween (sandwich lamination).

When a surface coating layer is provided, the surface coating layer is laminated on a surface of the base material layer 1 on a side opposite to the barrier layer 3. The surface coating layer can be formed by, for example, coating a surface of the base material layer 1 with the resin that forms the surface coating layer. The order of the step of laminating the barrier layer 3 on a surface of the base material layer 1 and the step of laminating the surface coating layer on a surface of the base material layer 1 is not particularly limited. For example, the surface coating layer may be formed on a surface of the base material layer 1, followed by forming the barrier layer 3 on a surface of the base material layer 1 on a side opposite to the surface coating layer.

A laminate including the surface coating layer provided if necessary, the base material layer 1, the adhesive agent layer 2 provided if necessary, the corrosion-resistant film provided if necessary, the barrier layer 3, the corrosion-resistant film provided if necessary, the adhesive layer 5 provided if necessary, and the heat-sealable resin layer 4 in this order is formed in the manner described above, and the laminate may be further subjected to a heating treatment of a hot roll contact type, a hot air type, a near-infrared type, a far-infrared type or the like for enhancing the bondability of the adhesive agent layer 2 and the adhesive layer 5 provided if necessary. As conditions for such a heating treatment, for example, the temperature is about 150 to 250° C., and the time is about 1 to 5 minutes.

The buffer layer 6 may be laminated outside the heat-sealable resin layer 4 (on the barrier layer 3 side). Thus, the buffer layer 6 may be laminated in conformity to a lamination location in the lamination step. For example, when the exterior material 10 including the buffer layer 6, the adhesive agent layer 2, the base material layer 1, the adhesive agent layer 2, the barrier layer 3, the adhesive layer 5 and the heat-sealable resin layer 4 in this order is produced, the exterior material 10 can be produced by laminating the base material layer 1 on one surface of the barrier layer 3 with the adhesive agent layer 2 interposed therebetween, laminating the buffer layer 6 on the base material layer 1 with the adhesive agent layer 2 interposed therebetween, and laminating the adhesive layer 5 and the heat-sealable resin layer 4 on the other surface of the barrier layer 3.

In the exterior material for an all-solid-state battery, the layers that form the laminate may be subjected to a surface activation treatment such as a corona treatment, a blast treatment, an oxidation treatment or an ozone treatment if necessary for improving or stabilizing film formability, lamination processing and final product secondary processing (pouching and embossing molding) suitability, and the like. For example, by subjecting at least one surface of the base material layer 1 to a corona treatment, film formability, lamination processing and final product secondary processing suitability, and the like can be improved. Further, for example, by subjecting a surface of the base material layer 1, which is opposite to the barrier layer 3, to a corona treatment, the ink printability of the surface of the base material layer 1 can be improved.

EXAMPLES

Hereinafter, the present disclosure will be described in detail by way of examples and comparative examples. However, the present disclosure is not limited to examples.
<Production of Exterior Material>

Example 1

A biaxially stretched nylon film (thickness: 15 µm) was prepared as a base material layer. Next, a barrier layer including an aluminum foil (JIS H 4160: 1994 A8021H-O, thickness: 40 μm, a corrosion-resistant film including chromic acid is formed on both surfaces) was laminated on the base material layer by a dry lamination method. Specifically, a two-liquid curable urethane adhesive (polyol compound and aromatic isocyanate compound) was applied to one surface of the aluminum foil to form an adhesive agent layer (thickness after curing: 3 μm) was formed on the aluminum foil. The adhesive agent layer on the aluminum foil and the biaxially stretched nylon film were then laminated, and a laminate of base material layer/adhesive agent layer/barrier layer was prepared. Next, a nonwoven fabric (polyethylene terephthalate fiber having a fiber diameter of 10 μm, a thickness of 2,600 μm, and an areal weight of 120 g/m$^2$) as a buffer layer was laminated on the base material layer of the laminate by a dry lamination method. The adhesive used for adhesion between the base material layer and the buffer layer by the dry lamination method was a two-liquid curable urethane adhesive (polyol compound and aromatic isocyanate compound), and the thickness after curing was 3 μm. The obtained laminate was subjected to aging treatment. Next, on the barrier layer of the laminate, maleic anhydride-modified polypropylene (thickness: 40 μm) as an adhesive layer and polypropylene (thickness: 40 μm) as a heat-sealable resin layer were co-extruded to laminate an adhesive layer and a heat-sealable resin layer on the barrier layer. Next, the obtained laminate was aged, and heated to obtain an exterior material in which a buffer layer (2,600 μm), an adhesive agent layer (3 μm), a base material layer (15 μm), an adhesive agent layer (3 μm), a barrier layer (40 μm), an adhesive layer (40 μm) and a heat-sealable resin layer (40 μm) were laminated in this order.

Example 2

A biaxially stretched nylon film (thickness: 15 μm) was prepared as a base material layer. Next, a barrier layer including an aluminum foil (JIS H 4160: 1994 A8021H-O, thickness: 40 μm, a corrosion-resistant film including chromic acid is formed on both surfaces) was laminated on the base material layer by a dry lamination method. Specifically, a two-liquid curable urethane adhesive (polyol compound and aromatic isocyanate compound) was applied to one surface of the aluminum foil to form an adhesive agent layer (thickness after curing: 3 μm) was formed on the aluminum foil. The adhesive agent layer on the aluminum foil and the biaxially stretched nylon film were then laminated, and a laminate of base material layer/adhesive agent layer/barrier layer was prepared. Next, a silicon rubber sheet (having a thickness of 1 mm and a rubber hardness 50) as a buffer layer was laminated on the base material layer of the laminate by a dry lamination method. The adhesive used for adhesion between the base material layer and the buffer layer by the dry lamination method was a two-liquid curable urethane adhesive (polyol compound and aromatic isocyanate compound), and the thickness after curing was 3 μm. The obtained laminate was subjected to aging treatment. Next, on the barrier layer of the laminate, maleic anhydride-modified polypropylene (thickness: 40 μm) as an adhesive layer and polypropylene (thickness: 40 μm) as a heat-sealable resin layer were co-extruded to laminate an adhesive layer and a heat-sealable resin layer on the barrier layer. Next, the obtained laminate was aged, and heated to obtain an exterior material in which a buffer layer (1 mm), an adhesive agent layer (3 μm), a base material layer (15 μm), an adhesive agent layer (3 μm), a barrier layer (40 μm), an adhesive layer (40 μm) and a heat-sealable resin layer (40 μm) were laminated in this order.

Example 3

A biaxially stretched nylon film (thickness: 15 μm) was prepared as a base material layer. Next, a barrier layer including an aluminum foil (JIS H 4160: 1994 A8021H-O, thickness: 40 μm, a corrosion-resistant film including chromic acid is formed on both surfaces) was laminated on the base material layer by a dry lamination method. Specifically, a two-liquid curable urethane adhesive (polyol compound and aromatic isocyanate compound) was applied to one surface of the aluminum foil to form an adhesive agent layer (thickness after curing: 3 μm) was formed on the aluminum foil. The adhesive agent layer on the aluminum foil and the biaxially stretched nylon film were then laminated, and a laminate of base material layer/adhesive agent layer/barrier layer was prepared. Next, a nonwoven fabric (polyethylene terephthalate fiber having a fiber diameter of 10 μm, a thickness of 160 μm, and an areal weight of 30 g/m$^2$) as a buffer layer was laminated on the base material layer of the laminate by a dry lamination method. The adhesive used for adhesion between the base material layer and the buffer layer by the dry lamination method was a two-liquid curable urethane adhesive (polyol compound and aromatic isocyanate compound), and the thickness after curing was 3 μm. The obtained laminate was subjected to aging treatment. Next, on the barrier layer of the laminate, maleic anhydride-modified polypropylene (thickness: 40 μm) as an adhesive layer and polypropylene (thickness: 40 μm) as a heat-sealable resin layer were co-extruded to laminate an adhesive layer and a heat-sealable resin layer on the barrier layer. Next, the obtained laminate was aged, and heated to obtain an exterior material in which a buffer layer (160 μm), an adhesive agent layer (3 μm), a base material layer (15 μm), an adhesive agent layer (3 μm), a barrier layer (40 μm), an adhesive layer (40 μm) and a heat-sealable resin layer (40 μm) were laminated in this order.

Comparative Example 1

Except that a buffer layer and the underlying adhesive agent layer were not provided, the same procedure as in Example 1 was carried out to obtain an exterior material in which a base material layer (15 μm), an adhesive agent layer (3 μm), a barrier layer (40 μm), an adhesive layer (40 μm) and a heat-sealable resin layer (40 μm) were laminated in this order.

<Production of All-Solid-State Battery>

Using the exterior material 10 obtained in each of Example 1 and Comparative Example 1, an all-solid-state battery 70 as shown in the schematic diagram of FIG. 1 was prepared. Specifically, in a vacuum environment, a positive electrode layer 30 having LiCoO$_2$ laminated as a positive active material layer 31 (thickness: 100 μm) on an aluminum alloy foil as a positive electrode current collector 32 (thickness: 20 μm), and a negative electrode layer 20 having graphite laminated as a negative active material layer 21 (thickness: 100 μm) on a SUS 304 foil as a negative electrode current collector 22 (thickness: 30 μm) were laminated with a solid electrolyte layer 40 (Li$_2$S:P$_2$S$_5$=70: 30, thickness: 100 μm) interposed therebetween to prepare a unit cell 50. In plan view of the all-solid-state battery, the positive active material layer 31 has a length of 25 mm and a width of 25 mm, the positive electrode current collector 32 has a length of 50 mm and a width of 30 mm, the negative active material layer 21 has a length of 30 mm and a width of 30 mm, the negative electrode current collector 22 has a length of 50 mm and a width of 30 mm, and the solid electrolyte layer has a length of 30 mm and a width of 30 mm. Next, a terminal 60 was bonded to each of the positive electrode current collector 32 and the negative electrode current collector 22.

Next, two exterior materials as described above (having a length 40 mm×a width of 40 mm) were prepared. Next, the unit cell 50 was sandwiched vertically in such a manner that the heat-sealable resin layers of the two exterior materials were opposed to each other, and the peripheral edge portion of the exterior material was heat-sealed in a vacuum environment to prepare each all-solid-state battery.

<Evaluation of Uniformity of High-Pressure Press>

The uniformity of high-pressure pressing on the press surface of the exterior material obtained as described above was evaluated as follows. First, two exterior materials (having a length of 60 mm and a width of 60 mm) produced in each of Example 1 to 3 and Comparative Example 1 were prepared. The first exterior material was placed on a horizontal plane in such a manner that the heat-sealable resin layer of the first exterior material was on the upper side, and an aluminum block (having a length of 50 mm and a width of 50 mm) was placed thereon. Prescale (pressure image analysis system FPD-9210 manufactured by FUJIFILM Corporation) was further placed on the aluminum block, and the second exterior material was placed thereon in such a manner that the heat-sealable resin layer was on the lower side. In this state, high-pressure pressing was performed vertically at a pressure of 100 MPa (high-pressure pressing is performed vertically with stainless steel plates), the pressing was ended after a lapse of 1 hour, and a distribution of pressure applied to the exterior material was evaluated by the Prescale. The uniformity of the high-pressure pressing was evaluated with a pressure image analysis system FPD-9210 in accordance with the following criteria. Score "A" was given when the pressure difference between the central portion (5 mm square area) and the peripheral portion at a press position was less than ±10%, score "B" was given when the above-mentioned pressure difference is ±10 to 20%, and score "C" was given when the above-mentioned pressure difference is more than ±30%. Table 1 shows the results.

TABLE 1

|  | Presence or absence of buffer layer | Uniformity of high-pressure pressing |
|---|---|---|
| Example 1 | Present | A |
| Example 2 | Present | A |
| Example 3 | Present | B |
| Comparative Example 1 | Absent | C |

As described above, the present disclosure provides inventions of aspects as described below.

Item 1. An exterior material for an all-solid-state battery, the exterior material including a laminate including at least a base material layer, a barrier layer, and a heat-sealable resin layer in this order from outside, the laminate including a layer having a buffer function outside the heat-sealable resin layer.

Item 2. The exterior material for an all-solid-state battery according to item 1, in which the layer having a buffer function is provided outside the barrier layer.

Item 3. The exterior material for an all-solid-state battery according to item 1 or 2, in which the layer having a buffer function is formed of rubber or a nonwoven fabric.

Item 4. The exterior material for an all-solid-state battery according to any one of items 1 to 3, in which the base material layer forms the layer having a buffer function.

Item 5. An all-solid-state battery in which a battery element including at least a unit cell including a positive active material layer, a negative active material layer, and a solid electrolyte layer laminated between the positive active material layer and the negative active material layer is stored in a packaging formed from an exterior material for an all-solid-state battery, in which
the exterior material for an all-solid-state battery includes a laminate including at least a base material layer, a barrier layer, and a heat-sealable resin layer in this order from outside, and
the laminate includes a layer having a buffer function outside the heat-sealable resin layer.

Item 6. A method for producing an exterior material for an all-solid-state battery, the method including a step of laminating at least a base material layer, a barrier layer, and a heat-sealable resin layer in this order from outside to obtain a laminate,
the laminate including a layer having a buffer function outside the heat-sealable resin layer.

DESCRIPTION OF REFERENCE SIGNS

1: Base material layer
2: Adhesive agent layer
3: Barrier layer
4: Heat-sealable resin layer
5: Adhesive layer
6: Buffer layer
10: Exterior material for all-solid-state battery
11: Press surface
20: Negative electrode layer
21: Negative active material layer
22: Negative electrode current collector
30: Positive electrode layer
31: Positive active material layer
32: Positive electrode current collector
40: Solid electrolyte layer
50: Unit cell
60: Terminal
70: All-solid-state battery

The invention claimed is:

1. An exterior material for an all-solid-state battery, the exterior material comprising a laminate including at least a base material layer, a barrier layer, and a heat-sealable resin layer in this order from outside,
the laminate including a layer having a buffer function outside the heat-sealable resin layer,
wherein the laminate includes an adhesive layer joining the layer having a buffer function to a joined layer,
wherein the joined layer is one of the base material layer, the barrier layer, and the heat-sealable resin layer,
wherein a single layer of the laminate includes the heat-sealable resin layer as an innermost layer, and the adhesive layer is positioned between the layer having a buffer function and the innermost layer of the laminate in a stacking direction of the laminate in the single layer of the laminate, and wherein the adhesive layer is directly joins the layer having a buffer function on a first surface of the adhesive layer to the joined layer on a second surface of the adhesive layer, opposite of the first surface, in the stacking direction of the laminate.

2. The exterior material for an all-solid-state battery according to claim 1, wherein the layer having a buffer function is provided outside the barrier layer.

3. The exterior material for an all-solid-state battery according to claim 1, wherein the layer having a buffer function is formed of rubber or a nonwoven fabric.

4. The exterior material for an all-solid-state battery according to claim 1, wherein the joined layer is the barrier layer or the heat-sealable resin layer, and the base material layer forms the layer having a buffer function.

5. An all-solid-state battery in which a battery element including at least a unit cell including a positive active material layer, a negative active material layer, and a solid electrolyte layer laminated between the positive active material layer and the negative active material layer is stored in a packaging formed from an exterior material for an all-solid-state battery, wherein
the exterior material for an all-solid-state battery includes a laminate including at least a base material layer, a barrier layer, and a heat-sealable resin layer in this order from outside,
the laminate includes a layer having a buffer function outside the heat-sealable resin layer, and
wherein the laminate includes an adhesive layer joining the layer having a buffer function to a joined layer, wherein the joined layer is one of the base material layer, the barrier layer, and the heat-sealable resin layer,
wherein a single layer of the laminate includes the heat-sealable resin layer as an innermost layer, and the adhesive layer is positioned between the layer having a buffer function and the innermost layer of the laminate in a stacking direction of the laminate in the single layer of the laminate, and
wherein the adhesive layer directly joins the layer having a buffer function on a first surface of the adhesive layer to the joined layer on a second surface of the adhesive layer, opposite of the first surface, in the stacking direction of the laminate.

6. A method for producing an exterior material for an all-solid-state battery, the method comprising a step of laminating at least a base material layer, a barrier layer, and a heat-sealable resin layer in this order from outside to obtain a laminate,
the laminate including a layer having a buffer function outside the heat-sealable resin layer,
wherein the laminate includes an adhesive layer joining the layer having a buffer function to a joined layer, wherein the joined layer is one of the base material layer, the barrier layer, and the heat-sealable resin layer,
wherein a single layer of the laminate includes the heat-sealable resin layer as an innermost layer, and the adhesive layer is positioned between the layer having a buffer function and the innermost layer of the laminate in a stacking direction of the laminate in the single layer of the laminate, and
wherein the adhesive layer directly joins the layer having a buffer function on a first surface of the adhesive layer to the joined layer on a second surface of the adhesive layer, opposite of the first surface, in the stacking direction of the laminate.

7. The exterior material for an all-solid-state battery according to claim 2, wherein the layer having a buffer function is formed of rubber or a nonwoven fabric.

8. The exterior material for an all-solid-state battery according to claim 2, wherein the joined layer is the barrier layer or the heat-sealable resin layer, and the base material layer forms the layer having a buffer function.

9. The exterior material for an all-solid-state battery according to claim 3, wherein the joined layer is the barrier layer or the heat-sealable resin layer, and the base material layer forms the layer having a buffer function.

10. The exterior material for an all-solid-state battery according to claim 7, wherein the joined layer is the barrier layer or the heat-sealable resin layer, and the base material layer forms the layer having a buffer function.

* * * * *